(12) United States Patent
Hosseini et al.

(10) Patent No.: US 11,032,824 B2
(45) Date of Patent: Jun. 8, 2021

(54) DOWNLINK CONTROL CHANNEL MONITORING CAPABILITIES

(71) Applicant: QUALCOMM Incorporated, San Diego, CA (US)

(72) Inventors: Seyedkianoush Hosseini, San Diego, CA (US); Jing Jiang, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 48 days.

(21) Appl. No.: 16/671,015

(22) Filed: Oct. 31, 2019

(65) Prior Publication Data

US 2020/0145984 A1    May 7, 2020

Related U.S. Application Data

(60) Provisional application No. 62/754,931, filed on Nov. 2, 2018.

(51) Int. Cl.
  *H04J 3/00*    (2006.01)
  *H04W 72/04*   (2009.01)

(52) U.S. Cl.
  CPC ....... *H04W 72/048* (2013.01); *H04W 72/042* (2013.01); *H04W 72/0446* (2013.01)

(58) Field of Classification Search
  CPC .......... H04W 72/048; H04W 72/0446; H04W 72/042; H04W 24/02; H04W 72/04; H04W 48/16

(Continued)

(56) References Cited

U.S. PATENT DOCUMENTS 10,834,781 B2 * 11/2020 Bendlin ............ H04W 74/0816
2009/0067378 A1 *  3/2009 Luo .................... H04L 1/0029
                                                      370/329

(Continued)

OTHER PUBLICATIONS

CATT: "Remaining Details of NR PDCCH Search Space," 3GPP Draft, 3GPP TSG RAN WG1 Meeting #93, R1-1806289, Remaining Details of NR PDCCH Search Space-Final, 3rd Generation Partnership Project (3GPP), Mobile Competence Centre, 650, Route Des Lucioles, F-06921 Sophia-Antipolis Cedex, vol. RAN WG1, No. Busan, Korea, May 21, 2018-May 25, 2018, May 20, 2018 (May 20, 2018), XP051441496, 5 pages, Retrieved from the Internet: URL: http://www.3gpp.org/ftp/Meetings%5F3GPP%5FSYNC/RAN1/Docs/ [retrieved on May 20, 2018] table 1 4. Conclusion.

(Continued)

*Primary Examiner* — Marceau Milord
(74) *Attorney, Agent, or Firm* — Linda G. Gunderson; Holland & Hart LLP

(57) ABSTRACT

Methods, systems, and devices for wireless communications are described. In some systems, a user equipment (UE) may monitor a downlink transmission for control information during a set of physical downlink control channel (PDCCH) monitoring occasions. The UE may determine a first configuration for the set of PDCCH monitoring occasions during a slot of the downlink transmission and a threshold number of PDCCH candidates and/or a threshold number of non-overlapping CCEs within the slot. In some cases, the UE may also determine a threshold number of PDCCH candidates and/or non-overlapping control channel elements (CCEs) within a single PDCCH monitoring occasion. The threshold number of PDCCH candidates and non-overlapping CCEs may be fixed, based on the number of PDCCH monitoring occasions during the slot, based on a processing capability of the UE, or a combination thereof. The UE may (Continued)

decode control information contained in one or more of the PDCCH monitoring occasions.

40 Claims, 15 Drawing Sheets

(58) Field of Classification Search
USPC .......................................... 370/336, 329, 311
See application file for complete search history.

(56) References Cited

U.S. PATENT DOCUMENTS

| 2018/0115968 | A1* | 4/2018 | Dallal | H04L 5/0044 |
|---|---|---|---|---|
| 2018/0176059 | A1* | 6/2018 | Medles | H04W 72/08 |
| 2019/0150073 | A1* | 5/2019 | Tiirola | H04W 72/10 |
| | | | | 455/434 |
| 2019/0349904 | A1* | 11/2019 | Kwak | H04W 72/042 |
| 2020/0028651 | A1* | 1/2020 | Xu | H04W 72/042 |
| 2020/0100248 | A1* | 3/2020 | Kim | H04W 72/0453 |
| 2020/0153672 | A1* | 5/2020 | Choi | H04W 72/042 |
| 2020/0220691 | A1* | 7/2020 | Gao | H04L 5/0053 |
| 2020/0221428 | A1* | 7/2020 | Moon | H04L 5/00 |

OTHER PUBLICATIONS

Ericsson: "Search Space Design for URLLC," 3GPP Draft, 3GPP TSG-RAN WG1 Meeting #93, R1-1806019, Search Space Design for URLLC, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 12, 2018 (May 12, 2018), XP051462288, 5 pages, Retrieved from the Internet: URL: http://www.3gpp.org/ftp/tsg%5Fran/WG1%5FRL1/TSGR1%5F93/Docs [retrieved on May 12, 2018], 2. Discussion, Proposals 3, 4.
Hamidi-Sepehr F., et al., "5G NR PDCCH: Design and Performance", 2018 IEEE 5G World Forum (5GWF), IEEE, Jul. 9, 2018 (Jul. 9, 2018), 6 pages, XP033432804, DOI: 10.1109/5GWF.2018.8517070, [retrieved on Oct. 31, 2018] [retrieved on Oct 31, 2018].
International Search Report and Written Opinion—PCT/US2019/059318—ISA/EPO—Feb. 3, 2020(190331WO).
NTT Docomo, et al., "Remaining Details on Search Space," 3GPP Draft, 3GPP TSG RAN WG1 Meeting 91, R1-1720812, 3rd Generation, Partnership Project (3GPP), Mobile Competence Centre, 650, Route Des Lucioles, F-06921, Sophia-antipolls Cedex, France, vol. RAN WG1, No. Reno, USA, Nov. 27, 2017-Dec. 1, 2017, Nov. 18, 2017 (Nov. 18, 2017), XP051370241, 9 pages, Retrieved from the Internet: URL: http://www.3gpp.org/ftp/tsg%5Fran/WG1%5FRL1/TSGR1%5F91/Docs/ [retrieved on Nov. 18, 2017] [retrieved on Nov. 18, 2017] 3. PDCCH blind decodings, 3.1 Number of PDCCH blind decodes per slot.
Qualcomm Incorporated: "L1 Enhancements for eURLLC," 3GPP Draft, 3GPP TSG-RAN WG1 #94, R1-1809457, L1 Enhancements For EURLLC, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 17, 2018 (Aug. 17, 2018), XP051516822, 12 pages, Retrieved from the Internet: URL: http://www.3gpp.org/ftp/tsg%5Fran/WG1%5FRL1/TSGR1%5F94/Docs/R1%2D1809457%2Ezip [retrieved on Aug. 17, 2018] 3 Downlink Enhancements: Enhanced PDCCH monitoring for mini-slot level scheduling 6 Reduced Processing Timeline for Stringent URLLC Latency Requirement.
Qualcomm Incorporated: "PDCCH Enhancements for eURLLC," 3GPP Draft, 3GPP TSG-RAN WG1 Meeting #96b, R1-1905019 PDCCH Enhancements for EURLLC, 3rd Generation Partnership Project (3gpp), Mobile Competence Centre, 650, Route Des Lucioles, F-06921, Sophia-Antipolis Cedex, France, vol. RAN WG1, No. Xi 'an, China, Apr. 8, 2019-Apr. 12, 2019, Apr. 3, 2019 (Apr. 3, 2019), XP051707361, 11 pages, Retrieved from the Internet: URL: http://www.3gpp.org/ftp/tsg%5Fran/WG1%5FRL1/TSGR1%5F96b/Docs/R1%2D1905019%2Ezip [retrieved on Apr. 3, 2019] the whole document.

* cited by examiner

DOWNLINK CONTROL CHANNEL MONITORING CAPABILITIES

CROSS REFERENCE

The present Application for Patent claims the benefit of U.S. Provisional Patent Application No. 62/754,931 by Hosseini et al., entitled "DOWNLINK CONTROL CHANNEL MONITORING CAPABILITIES," filed Nov. 2, 2018, assigned to the assignee hereof, and expressly incorporated by reference in its entirety.

BACKGROUND

The following relates generally to wireless communications, and more specifically to downlink control channel monitoring capabilities.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may configure a search space of physical downlink control channel (PDCCH) candidates to carry downlink control information (DCI) to a UE. In some cases, the base station may configure multiple PDCCH candidates for the UE to search, and the UE may perform several blind decodings to receive scheduled DCI. However, in some cases, the number of blind decodings required to be performed by the UE within a particular duration may be burdensome for the UE. For instance, the UE's performance may be affected due to a large number of decoding attempts performed within a relatively short duration, which may impact latency and efficiency in wireless communications by the UE.

SUMMARY

The described techniques relate to improved methods, systems, devices, or apparatuses that support downlink control channel monitoring capabilities. Generally, the described techniques provide support for limiting a decoding complexity and/or limiting a density of decoding occasions of the downlink channel. The limited decoding complexity may support lower latency communications when compared to communications employing a higher decoding complexity. In some systems, a base station may transmit downlink transmissions to a user equipment (UE) including one or more control portions and data portions. The UE may monitor a downlink transmission for control information during a set of physical downlink control channel (PDCCH) monitoring occasions. The UE may attempt to decode a configured set of PDCCH candidates (which may correspond to a set of non-overlapping control channel elements (CCEs) indicated as potentially containing control information for the UE) within each PDCCH monitoring occasion. A maximum number of PDCCH candidates may be defined (e.g., a threshold number of PDCCH candidates defined) for each PDCCH monitoring occasion. The maximum number of PDCCH within each PDCCH monitoring occasion may limit a maximum decoding complexity (and corresponding processing time) of each PDCCH monitoring occasion.

The decoding complexity for of the downlink transmission may further be controlled by limiting the decoding complexity of the data portion of the downlink transmission. For example, a number of physical downlink shared channels (PDSCHs) may be limited according to a maximum (e.g., threshold) number of PDSCHs. Additionally or alternatively, characteristics of the PDSCHs may be adjusted to decrease a decoding complexity of the PDSCH channels. For example, one or more of a transport block size (TB S), a rank, a modulation and coding scheme (MCS), and a number of component carriers (CCs) may be adjusted to decrease the decoding complexity of the PDSCH.

A method of wireless communication is described. The method may include determining a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions, determining a second configuration for monitoring the set of PDCCH monitoring occasions, the second configuration including a threshold number of PDCCH candidates, or a threshold number of non-overlapping CCEs, or a combination thereof, within the slot, monitoring, in accordance with the first configuration and the second configuration, for control information during the set of PDCCH monitoring occasions, and decoding the control information identified within at least one PDCCH monitoring occasion of the set of PDCCH monitoring occasions.

An apparatus for wireless communication is described. The apparatus may include a processor, memory in electronic communication with the processor, and instructions stored in the memory. The instructions may be executable by the processor to cause the apparatus to determine a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions, determine a second configuration for monitoring the set of PDCCH monitoring occasions, the second configuration including a threshold number of PDCCH candidates, or a threshold number of non-overlapping CCEs, or a combination thereof, within the slot, monitor, in accordance with the first configuration and the second configuration, for control information during the set of PDCCH monitoring occasions, and decode the control information identified within at least one PDCCH monitoring occasion of the set of PDCCH monitoring occasions.

Another apparatus for wireless communication is described. The apparatus may include means for determining a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions, determining a second configuration for monitoring the set of PDCCH monitoring occasions, the second configuration including a threshold number of PDCCH candidates, or a threshold number of non-overlapping CCEs, or a combination thereof, within the slot, monitoring, in accordance with the first configuration and the second configuration, for control information during the set of PDCCH monitoring occasions, and decoding the control information identified within at least one PDCCH monitoring occasion of the set of PDCCH monitoring occasions.

A non-transitory computer-readable medium storing code for wireless communication is described. The code may include instructions executable by a processor to determine a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions, determine a second configuration for monitoring the set of PDCCH monitoring occasions, the second configuration including a threshold number of PDCCH candidates, or a threshold number of non-overlapping CCEs, or a combination thereof, within the slot, monitor, in accordance with the first configuration and the second configuration, for control information during the set of PDCCH monitoring occasions, and decode the control information identified within at least one PDCCH monitoring occasion of the set of PDCCH monitoring occasions.

In some examples of the method, apparatuses, and non-transitory computer-readable medium described herein, the threshold number of PDCCH candidates, or the threshold number of non-overlapping CCEs, or both, within each PDCCH monitoring occasion may be fixed.

Some examples of the method, apparatuses, and non-transitory computer-readable medium described herein may further include operations, features, means, or instructions for determining a threshold number of PDSCHs within the slot based on a number of PDCCH decoding occasions within each PDCCH monitoring occasion of the set, and decoding data from one or more PDSCHs within the slot based on determining the threshold number of PDSCHs.

In some examples of the method, apparatuses, and non-transitory computer-readable medium described herein, the threshold number of PDCCH candidates, or the threshold number of non-overlapping CCEs, or a combination thereof, may be based on the threshold number of PDSCHs.

Some examples of the method, apparatuses, and non-transitory computer-readable medium described herein may further include operations, features, means, or instructions for decoding a PDSCH within the slot based on a threshold associated with a TBS for the PDSCH, a rank for the PDSCH, an MCS for the PDSCH, or a number of CCs for the PDSCH, or a combination thereof.

A method of wireless communication is described. The method may include determining a configuration for a set of PDCCH monitoring occasions within a slot, determining, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions, monitoring, in accordance with the configuration, for control information during the set of PDCCH monitoring occasions, and decoding the control information identified within at least one PDCCH monitoring occasion of the set of PDCCH monitoring occasions.

An apparatus for wireless communication is described. The apparatus may include a processor, memory in electronic communication with the processor, and instructions stored in the memory. The instructions may be executable by the processor to cause the apparatus to determine a configuration for a set of PDCCH monitoring occasions within a slot, determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions, monitor, in accordance with the configuration, for control information during the set of PDCCH monitoring occasions, and decode the control information identified within at least one PDCCH monitoring occasion of the set of PDCCH monitoring occasions.

Another apparatus for wireless communication is described. The apparatus may include means for determining a configuration for a set of PDCCH monitoring occasions within a slot, determining, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions, monitoring, in accordance with the configuration, for control information during the set of PDCCH monitoring occasions, and decoding the control information identified within at least one PDCCH monitoring occasion of the set of PDCCH monitoring occasions.

A non-transitory computer-readable medium storing code for wireless communication is described. The code may include instructions executable by a processor to determine a configuration for a set of PDCCH monitoring occasions within a slot, determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions, monitor, in accordance with the configuration, for control information during the set of PDCCH monitoring occasions, and decode the control information identified within at least one PDCCH monitoring occasion of the set of PDCCH monitoring occasions.

In some examples of the method, apparatuses, and non-transitory computer-readable medium described herein, the threshold number of PDCCH candidates, or the threshold number of non-overlapping CCEs, or both, within each PDCCH monitoring occasion may be inversely proportional to the number of PDCCH monitoring occasions.

Some examples of the method, apparatuses, and non-transitory computer-readable medium described herein may further include operations, features, means, or instructions for decoding a PDSCH within the slot based on a threshold associated with a TBS for the PDSCH, a rank for the PDSCH, an MCS for the PDSCH, or a number of CCs for the PDSCH, or a combination thereof.

Some examples of the method, apparatuses, and non-transitory computer-readable medium described herein may further include operations, features, means, or instructions for determining a threshold number of PDSCHs within the slot based on a number of PDCCH decoding occasions within each PDCCH monitoring occasion of the set, and decoding data from one or more PDSCHs within the slot based on determining the threshold number of PDSCHs.

In some examples of the method, apparatuses, and non-transitory computer-readable medium described herein, the threshold number of PDCCH candidates, or the threshold number of non-overlapping CCEs, or a combination thereof, may be based on the threshold number of PDSCHs.

A method of wireless communication is described. The method may include determining a configuration for a set of PDCCH monitoring occasions within a slot, determining, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability, monitoring, in accordance with the configuration, for control information during the set of PDCCH monitoring occasions, and decoding the control information identified within at least one PDCCH monitoring occasion of the set of PDCCH monitoring occasions.

An apparatus for wireless communication is described. The apparatus may include a processor, memory in electronic communication with the processor, and instructions stored in the memory. The instructions may be executable by the processor to cause the apparatus to determine a configuration for a set of PDCCH monitoring occasions within a slot, determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability, monitor, in accordance with the configuration, for control information during the set of PDCCH monitoring occasions, and decode the control information identified within at least one PDCCH monitoring occasion of the set of PDCCH monitoring occasions.

Another apparatus for wireless communication is described. The apparatus may include means for determining a configuration for a set of PDCCH monitoring occasions within a slot, determining, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability, monitoring, in accordance with the configuration, for control information during the set of PDCCH monitoring occasions, and decoding the control information identified within at least one PDCCH monitoring occasion of the set of PDCCH monitoring occasions.

A non-transitory computer-readable medium storing code for wireless communication is described. The code may include instructions executable by a processor to determine a configuration for a set of PDCCH monitoring occasions within a slot, determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability, monitor, in accordance with the configuration, for control information during the set of PDCCH monitoring occasions, and decode the control information identified within at least one PDCCH monitoring occasion of the set of PDCCH monitoring occasions.

In some examples of the method, apparatuses, and non-transitory computer-readable medium described herein, the threshold number of PDCCH candidates, or the threshold number of non-overlapping CCEs, or both, within each PDCCH monitoring occasion may be proportional to a number of PDCCH monitoring occasions within the slot.

Some examples of the method, apparatuses, and non-transitory computer-readable medium described herein may further include operations, features, means, or instructions for transmitting, to a base station, an indication of the UE capability, and identifying, based on the UE capability, a set of parameters corresponding to the threshold number of PDCCH candidates, or the threshold number of non-overlapping CCEs, or both.

In some examples of the method, apparatuses, and non-transitory computer-readable medium described herein, the UE capability includes a maximum number of PDCCH monitoring occasions supported by a UE.

Some examples of the method, apparatuses, and non-transitory computer-readable medium described herein may further include operations, features, means, or instructions for determining a threshold number of PDSCHs within the slot based on a number of PDCCH decoding occasions within each PDCCH monitoring occasion of the set, and decoding data from one or more PDSCHs within the slot based on determining the threshold number of PDSCHs.

In some examples of the method, apparatuses, and non-transitory computer-readable medium described herein, the threshold number of PDCCH candidates, or the threshold number of non-overlapping CCEs, or a combination thereof, may be based on the threshold number of PDSCHs.

Some examples of the method, apparatuses, and non-transitory computer-readable medium described herein may further include operations, features, means, or instructions for decoding a PDSCH within the slot based on a threshold associated with a TBS for the PDSCH, a rank for the PDSCH, an MCS for the PDSCH, or a number of CCs for the PDSCH, or a combination thereof.

DETAILED DESCRIPTION

Figure 1:
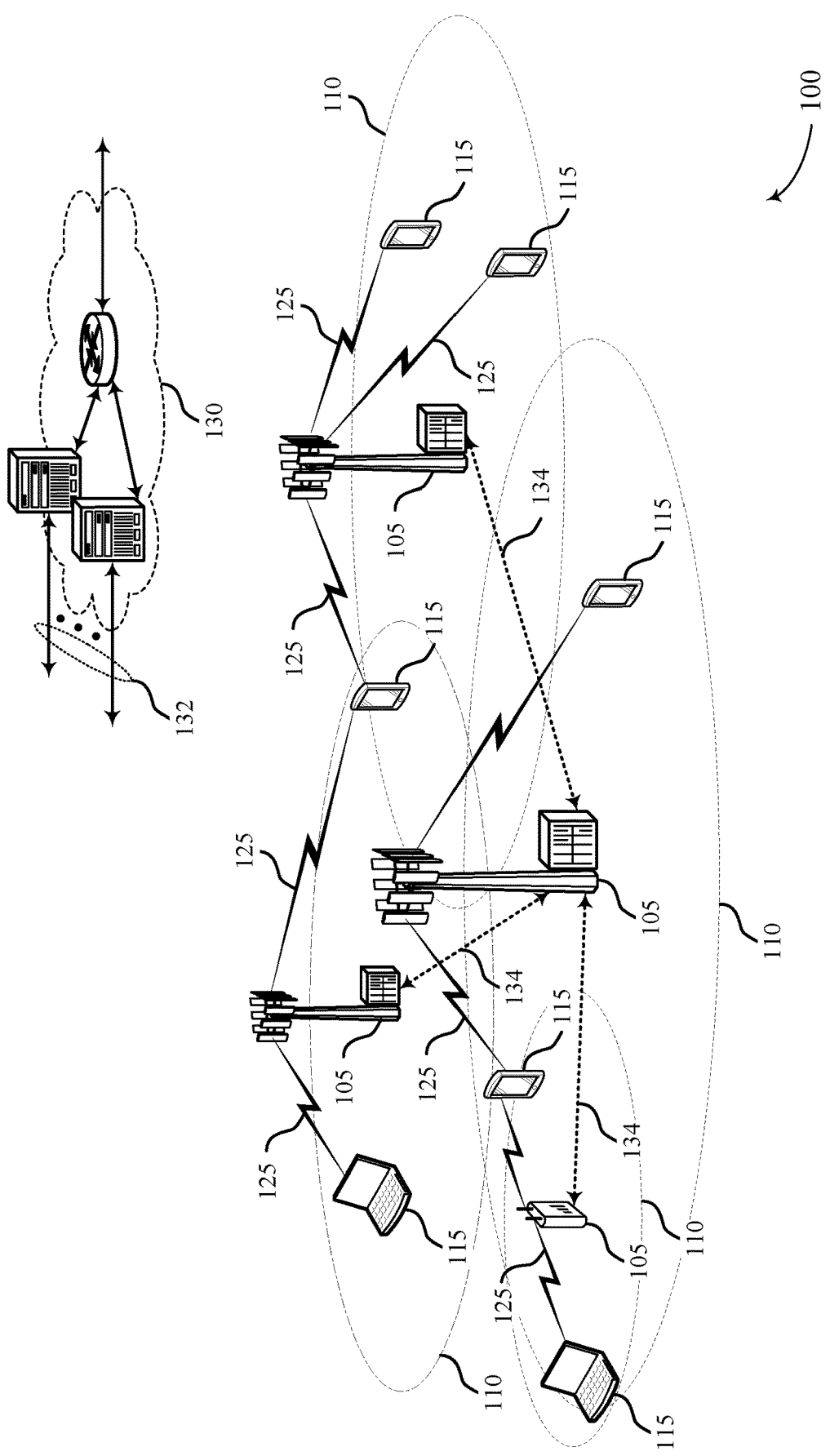
FIGS. 1 and 2 illustrate examples of a system for wireless communications in accordance with aspects of the present disclosure.

In some wireless communications systems, a base station may configure a search space set for a transmission of downlink control information (DCI) to a user equipment (UE). The search space set may include a number of blind decodings at multiple aggregation levels. In some cases, the base station may configure multiple search space sets for transmission of DCI to the UE, where each search space set may correspond to a different DCI format. Each search space set may include blind decodings at multiple aggregation levels, and the UE may perform several blind decodings to receive all of the DCI. However, a high number of blind decodings may increase decoding complexity at the UE.

A base station may transmit downlink transmissions to a UE including one or more control portions and data portions. The UE may monitor a downlink transmission for control information during a set of physical downlink control channel (PDCCH) monitoring occasions. The UE may attempt to decode a configured set of PDCCH candidates (which may correspond to a set of control channel elements (CCEs) indicated as potentially containing control information for the UE) within each PDCCH monitoring occasion. As described herein, a maximum (e.g., a threshold) number of PDCCH candidates may be defined for each PDCCH monitoring occasion. The maximum number of PDCCH within each PDCCH monitoring occasion may limit a maximum decoding complexity (and corresponding processing time) of each PDCCH monitoring occasion.

The maximum number of PDCCH candidates defined for each PDCCH monitoring occasion may be based one of several factors. In one case, the maximum number of PDCCH candidates defined for each PDCCH monitoring occasion may be fixed for the downlink transmission. For example, a maximum number of PDCCH candidates that a UE may decode according to some latency requirements may be adopted as the maximum number of PDCCH candidates within each PDCCH monitoring occasion. In another case, the maximum number of PDCCH candidates defined for each PDCCH monitoring occasion may be based on a number of PDCCH monitoring occasions in each slot of the downlink transmission. In a first example, the maximum number of PDCCH candidates defined for each PDCCH monitoring occasion may have an indirect relationship with the number of PDCCH monitoring occasions in the slot (e.g., as the number of PDCCH monitoring occasions in the slot increases, the maximum number of PDCCH candidates within each PDCCH monitoring occasion decreases). In a second example, the maximum number of PDCCH candidates defined for each PDCCH monitoring occasion may have a direct relationship with the number of PDCCH monitoring occasions in the slot (e.g., as the number of PDCCH monitoring occasions in the slot increases, the maximum number of PDCCH candidates within each PDCCH monitoring occasion increases, and vice versa). Here, a base station may determine that a UE that monitors a large number of PDCCH monitoring occasions per slot may be capable of decoding a large number of PDCCH candidates within each PDCCH monitoring occasion.

The decoding complexity for the downlink transmission may further be controlled (e.g., in combination with or independent from limitations placed on blind decodes and/or non-overlapping CCEs within a PDCCH decoding occasion) by limiting the decoding complexity of the data portion of the downlink transmissions. For example, a number of physical downlink shared channels (PDSCHs) may be limited according to a maximum (e.g., threshold) number of PDSCHs. Additionally or alternatively, characteristics of the PDSCHs may be adjusted to decrease a decoding complexity of the PDSCHs. For example, one or more of a transport block size (TBS), a rank, a modulation and coding scheme (MCS), and a number of component carriers (CCs) may be adjusted to decrease the decoding complexity of the PDSCH.

Aspects of the disclosure are initially described in the context of wireless communications systems. Additional aspects of the disclosure are described with reference to a slot allocation and process flows. Aspects of the disclosure are further illustrated by and described with reference to apparatus diagrams, system diagrams, and flowcharts that relate to downlink control channel monitoring capabilities.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support enhanced communications through limitations placed on a number of decoding opportunities within each PDCCH monitoring occasion.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel (e.g., a PDCCH) and a physical data channel (e.g., a PDSCH) may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

PDCCH carries DCI in CCEs, which may consist of nine logically contiguous resource element groups (REGs), where each REG contains four resource elements (REs). DCI includes information regarding downlink scheduling assignments, uplink resource grants, transmission scheme, uplink power control, HARQ information, MCS and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH may carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures and the like. The UE-specific search space may include user-specific control information. CCEs may be indexed, and the common search space may start from CCE 0. The starting index for a UE-specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support techniques that limit a decoding complexity and/or limiting a density of decoding occasions of the downlink channel. The limited decoding complexity may support lower latency communications when compared to communications employing a higher decoding complexity. In some systems, a base station 105 may transmit downlink transmissions to a UE 115 including one or more control portions and data portions. The UE 115 may monitor a downlink transmission for control information during a set of PDCCH monitoring occasions. The UE 115 may attempt to decode a configured set of PDCCH candidates (which may correspond to a set of non-overlapping CCEs indicated as potentially containing control information for the UE 115) within each PDCCH monitoring occasion. A maximum number of PDCCH candidates may be defined (e.g., a threshold number of PDCCH candidates defined) for each PDCCH monitoring occasion. The maximum number of PDCCH within each PDCCH monitoring occasion may limit a maximum decoding complexity (and corresponding processing time) of each PDCCH monitoring occasion.

In wireless communications system 100, the decoding complexity for of the downlink transmission may further be controlled by limiting the decoding complexity of the data portion of the downlink transmission. For example, a number of PDSCHs may be limited according to a maximum (e.g., threshold) number of PDSCHs. Additionally or alternatively, characteristics of the PDSCHs may be adjusted to decrease a decoding complexity of the PDSCH channels. For example, a TBS, a rank, an MCS, a number of CCs, or a combination thereof may be adjusted to decrease the decoding complexity of the PDSCH.

Figure 2:
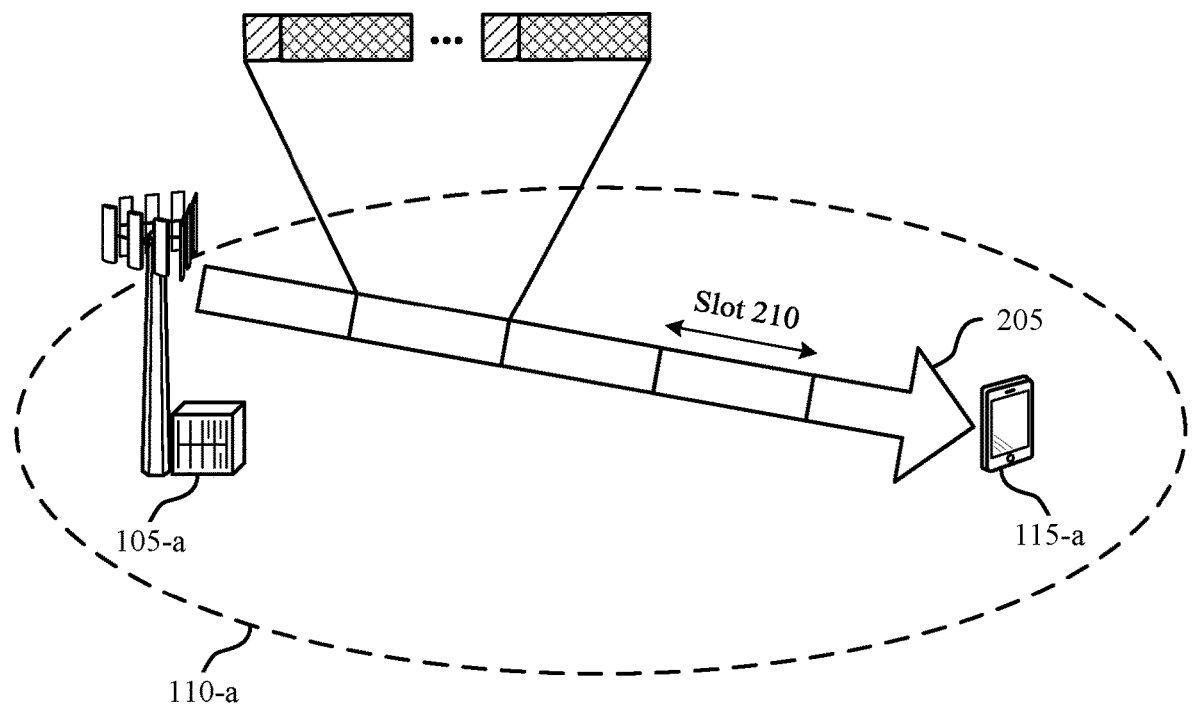

FIG. 2 illustrates an example of a wireless communications system 200 in accordance with aspects of the present disclosure. In some examples, wireless communications system 200 may implement aspects of wireless communications system 100. For example, wireless communications system 200 may include base station 105-a and UE 115-a, which may be examples of a base station 105 and a UE 115 as described with reference to FIG. 1. Base station 105-a may provide network coverage for geographic coverage area 110-a. Base station 105-a may communicate with UE 115-a on the downlink 205. Downlink 205 may include control portions (e.g., within a PDCCH monitoring occasion 215) and data portions (e.g., within a PDSCH 220). For example, base station 105-a may transmit some control data within DCI to UE 115-a during one or more of the PDCCH monitoring occasions 215. UE 115-a may monitor the downlink 205 during each of the PDCCH monitoring occasions 215 to receive the DCI. UE 115-a may communicate with base station 105-a based on the received DCI. In some cases, UE 115-a may decode one or more data regions within PDSCH 220 according to the received DCI.

In some wireless communications systems 200 (e.g., new radio (NR) systems), UE 115-a may determine one or more of the PDSCHs 220 to monitor for one or more symbol durations based on decoding some DCI within a PDCCH monitoring occasion 215. Base station 105-a may transmit some control information within a PDCCH monitoring occasion 215 for each PDSCH 220 duration within a slot 210. For example, each slot 210 may include 2-symbol PDSCHs 220 (e.g., each slot 210 includes seven 2-symbol PDSCHs 220 and seven corresponding PDCCH monitoring occasions 215). In another example, each slot 210 may include 4-symbol PDSCHs 220 (e.g., each slot 210 includes four 4-symbol PDSCHs 220 and four corresponding PDCCH monitoring occasions 215). In another example, each slot 210 may include 7-symbol PDSCHs 220 (e.g., each slot 210 includes two 7-symbol PDSCHs 220 and two corresponding PDCCH monitoring occasions 215). The power consumption of UE 115-a may increase as a number of PDCCH monitoring occasions 215 increases.

In some cases, UE 115-a and base station 105-a may support retransmissions of data within the PDSCH 220 to increase the likelihood that PDSCH data is received successfully. For instance, the use of HARQ may include a combination of error detection (e.g., using a CRC), FEC, and retransmission (e.g., ARQ). HARQ may improve throughput at the MAC layer in poor radio conditions (e.g., signal-to-noise conditions). UE 115-a may operate according to a timing capability (e.g., a low-latency communications system) where the UE 115-a may provide HARQ feedback for data within the PDSCH 220 within a certain time interval (e.g., a defined number of symbols). For example, under a timing capability of 5 symbols, UE 115-a may provide HARQ feedback for data sent during the PDSCH 220 within the 5 symbols.

UE 115-a may decode one or more portions of the downlink 205 in order to decode DCI relevant to UE 115-a. Therefore, in order to operate according to a defined timing capability (e.g., 5 symbols), UE 115-a may decode control information (e.g., DCI) according to the defined timing capability of UE 115-a. Base station 105-a may transmit the control information during one or more of the PDCCH monitoring occasions 215. The PDCCH monitoring occasion 215 may be a search space for DCI that contains a number of CCEs and spans a time duration of downlink 205 (e.g., slot, mini-slot, subframe, symbol, etc.). UE 115-a may monitor one or more of the PDCCH monitoring occasions 215 in order to determine the DCI. In some cases, the PDCCH monitoring occasions 215 may include UE 115-a monitoring all of the synchronization signal sets within three consecutive OFDM symbols that have fixed positions within each slot 210. For example, the PDCCH monitoring occasions 215 may span up to three OFDM symbols at the beginning of a slot 210. In another example, the PDCCH monitoring occasion 215 may span up to three consecutive OFDM symbols of a slot 210 (e.g., may not be at the beginning of the slot 210). Here, the PDCCH monitoring occasions 215 may be within the same consecutive OFDM symbols from one slot 210 to another slot 210. In another example, the PDCCH monitoring occasions 215 may not be constrained to three consecutive OFDM symbols, and the PDCCH monitoring occasions 215 may be located at different locations within a slot 210.

In some cases, base station 105-a may configure a set of PDCCH candidates (e.g., a set of the CCEs) within each of the PDCCH monitoring occasions 215. The PDCCH candidates may correspond to a set of non-overlapping CCEs within the PDCCH monitoring occasion 215 that may include the DCI for UE 115-a. UE 115-a may attempt to blindly decode each of the PDCCH candidates to retrieve relevant DCI. There may be a maximum number of PDCCH candidates and total number of non-overlapping CCEs in each slot 210. The maximum number may be defined for a single base station 105, such as base station 105-a. Enacting a maximum number of PDCCH candidates and/or non-overlapping CCEs within each slot 210 may decrease a decoding complexity of some control information (e.g., as contained within the one or more PDCCH monitoring occasions 215) for UE 115-*a*. In some cases, the decoding complexity of the PDCCH may correspond to an amount of time it takes UE 115-*a* to determine the DCI. Therefore, decreasing the decoding complexity of the PDCCH may allow UE 115-*a* to operate according to a faster timing capability. Table 1 shows possible values for the maximum number of PDCCH candidates within a slot 210 of downlink 205. The maximum number of PDCCH candidates may within a slot 210 may be based on a subcarrier spacing configuration (e.g., μ) for base station 105-*a*.

TABLE 1

Maximum Number of PDCCH Candidates per Slot

| μ | Maximum Number of PDCCH Candidates per Slot |
|---|---|
| 0 | 44 |
| 1 | 36 |
| 2 | 22 |
| 3 | 20 |

Table 2 shows possible values for the maximum number of CCEs within a slot 210 of downlink 205. The maximum number of non-overlapping CCEs may correspond to a number of CCEs per slot 210 that are non-overlapping (e.g., in a time domain, in a frequency domain). The maximum number of non-overlapping CCEs within a slot 210 may be based on a subcarrier spacing configuration (e.g., μ) for base station 105-*a*.

TABLE 2

Maximum Number of CCEs per Slot

| μ | Maximum Number of non-overlapping CCEs per Slot |
|---|---|
| 0 | 56 |
| 1 | 56 |
| 2 | 48 |
| 3 | 32 |

However, in some cases, a single PDCCH monitoring occasion 215 (or a small number of PDCCH monitoring occasions 215) may contain a large portion of PDCCH candidates. For example, in an example where base station 105-*a* has a maximum number of PDCCH candidates of 20 (e.g., base station 105-*a* utilizes a subcarrier spacing configuration of 3), there may be 20 PDCCH candidates within a single PDCCH monitoring occasion 215. In the case that a large number of PDCCH candidates are contained within a small number of PDCCH monitoring occasions 215, the decoding time associated with the small number of PDCCH monitoring occasions 215 may increase. In some cases, the increased decoding time may not be compatible with low latency communications (e.g., corresponding to a timing capability defined by a small number of symbols). That is, the decoding time for decoding the PDCCH monitoring occasion 215 may surpass the time defined by the timing capability. Therefore, given the fast processing time needed for low latency communications, each PDCCH monitoring occasion 215 may not include a large portion of the PDCCH candidates.

As described herein, there may be a maximum number of PDCCH candidates defined (e.g., a threshold number of PDCCH candidates defined) for each PDCCH monitoring occasion 215. Enacting a maximum number of PDCCH within each PDCCH monitoring occasion 215 may limit a maximum decoding complexity (and corresponding processing time) of each PDCCH monitoring occasion 215. Base station 105-*a* may transmit control information to UE 115-*a* within a number of PDCCH candidates that is less than the maximum number defined for the slot 210 while further transmitting a number of PDCCH candidates within each PDCCH monitoring occasion 215 that is less than the maximum number of PDCCH candidates defined for each PDCCH monitoring occasion 215. Therefore, the decoding complexity may be limited for each PDCCH monitoring occasion 215 so that decoding a single PDCCH monitoring occasion 215 may necessarily occur within a timeline acceptable based on the timing capability of UE 115-*a*.

The decoding complexity for each slot 210 on downlink 205 may further be limited by limiting a number of PDSCHs 220 within each slot 210. In some cases, a number of PDSCHs 220 within each slot 210 may correspond to a number of PDCCH monitoring occasions 215. However, in some cases, downlink 205 may limit a number of PDSCHs 220 in order to further decrease the decoding complexity of downlink 205 (e.g., decrease UE's 115-*a* total number of blind decodes and/or a number of non-overlapping CCEs within each slot 210 for decoding). For example, in a case where each slot 210 includes seven PDCCH monitoring occasions 215 (e.g., the slot 210 includes a PDCCH monitoring occasion 215 in every two consecutive symbols within the slot 210), rather than including seven PDSCHs 220 for the UE 115-*a* to decode, the base station 105-*a* may limit the number of PDSCHs 220 within the slot 210 to two PDSCHs 220. This may decrease the processing required by the UE 115-*a* within each slot 210 of downlink 205.

In some cases, the encoding complexity for each slot 210 of an uplink transmission may also be limited by limiting a number of physical uplink shared channels (PUSCHs) within each slot 210. In such cases, a number of PUSCHs within each slot 210 of an uplink may correspond to a number of PDCCH monitoring occasions or a number of PDSCHs 220. In some cases, there may limit a number of PUSCHs in order to further decrease the complexity of uplink encoding (e.g., which may likewise decrease decoding complexity at base station 105-*a*). For example, in a case where each slot 210 includes seven PDCCH monitoring occasions 215 (e.g., the slot 210 includes a PDCCH monitoring occasion 215 in every two consecutive symbols within the slot 210), rather than requiring seven PUSCHs for the UE 115-*a* to encode, the base station 105-*a* may limit the number of PUSCHs within a slot 210 to two PUSCHs. This may decrease the processing required by the UE 115-*a* within each slot. In such cases, the UE 115-*a* may accordingly encode uplink data (and perform MAC layer procedures) when constructing a packet for PUSCH transmissions.

Figure 3:
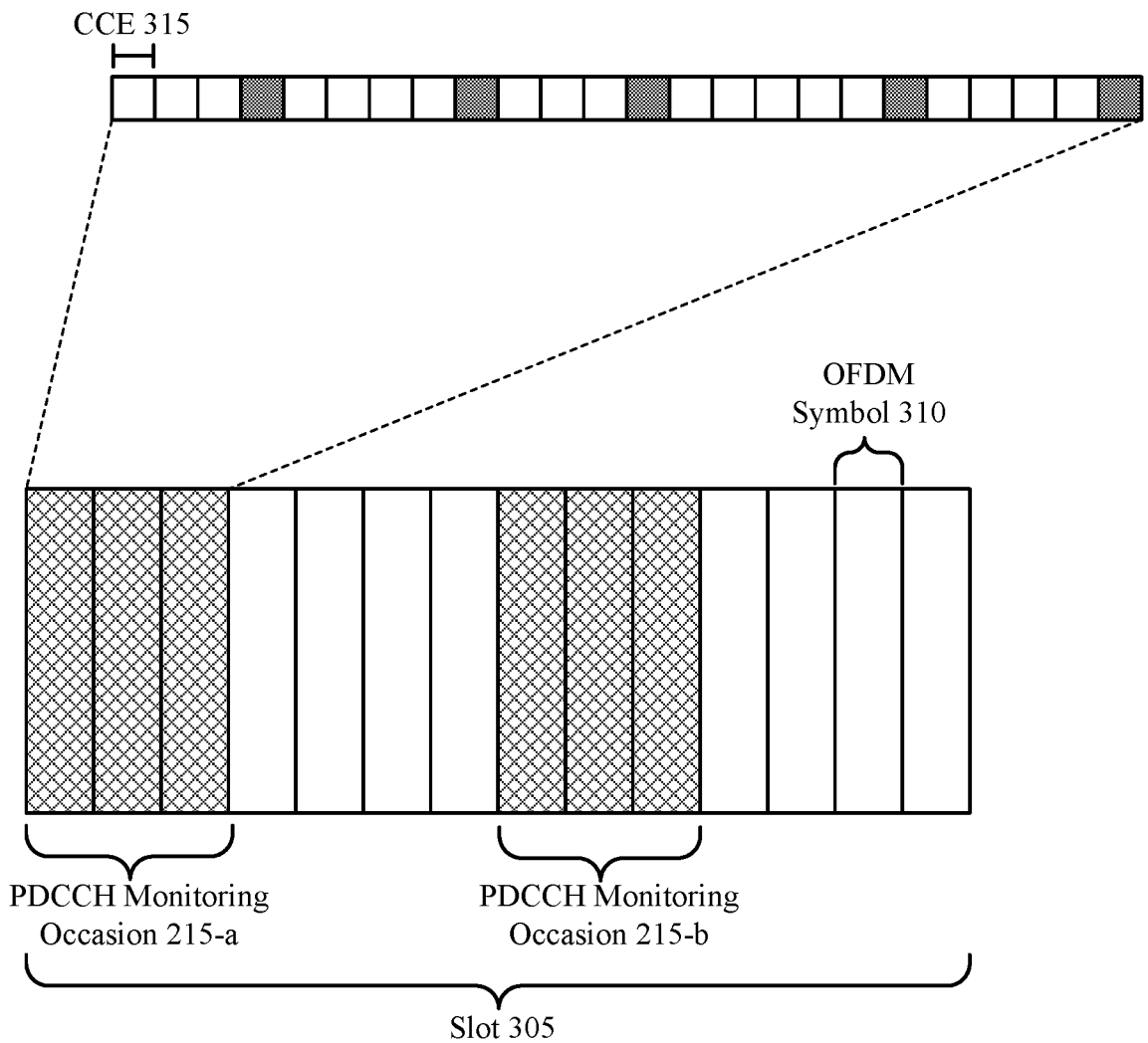
FIG. 3 illustrates an example of a slot configuration in accordance with aspects of the present disclosure.

FIG. 3 illustrates an example of a slot configuration 300 in accordance with aspects of the present disclosure. In some examples, slot configuration 300 may implement aspects of wireless communications system 100 and/or wireless communications system 200. Aspects of slot configuration 300 may be implemented by a UE 115 and/or a base station 105, which may be examples of the corresponding device described herein. For example, slot configuration 300 may include PDCCH monitoring occasions 215 which may be examples of PDCCH monitoring occasions 215 as described with reference to FIG. 2.

The slot 305 may include 14 OFDM symbols 310. A portion of the OFDM symbols 310 may be configured as PDCCH monitoring occasions 215. Here, the slot 305 includes two PDCCH monitoring occasions 215 each spanning 3 symbols, however other examples may include more or less PDCCH monitoring occasions 215 within a slot 305 that spans more or less than 3 symbols each. The PDCCH monitoring occasions 215 may each include one or more PDCCH candidates 320, where the PDCCH candidates 320 correspond to one or more CCEs 315 that may include control information (e.g., DCI). A UE 115 may detect the control information by blindly decoding each of the CCEs 315 that are configured (e.g., by a base station 105) as PDCCH candidates 320 within each PDCCH monitoring occasion 215.

The slot configuration 300 may operate according to a maximum number of defined PDCCH candidates 320 (e.g., a threshold number of PDCCH candidates 320). The maximum number of defined PDCCH candidates 320 may correspond to a maximum number of PDCCH candidates 320 in a single slot 305. Additionally or alternatively, the maximum number of defined PDCCH candidates 320 may correspond to a maximum number of PDCCH candidates 320 within a single PDCCH monitoring occasion 215. Here, each PDCCH monitoring occasion 215 may include five PDCCH candidates 320. In this example, a UE 115 may perform blind decoding within each of the five PDCCH candidates 320 in order to detect and receive DCI from a base station 105.

In some cases, the maximum number of PDCCH candidates 320 within each PDCCH monitoring occasion 215 may be fixed. For example, a maximum number of PDCCH candidates 320 for any of the PDCCH monitoring occasions 215 may be defined (e.g., preconfigured). Here, the maximum number of PDCCH candidates 320 may correspond to a maximum number of CCEs 315 that a UE 115 may blindly decode within each PDCCH monitoring occasion 215. In some cases, the maximum number of PDCCH candidates 320 may be based on the timing capabilities of the UE 115 (e.g., a defined maximum number of symbols between a UE 115 receiving some PDSCH data and responding with HARQ feedback).

In another case, the maximum number of PDCCH candidates 320 within each PDCCH monitoring occasion 215 may be based on the PDCCH monitoring occasions 215 within the slot 305. For example, the maximum number of PDCCH candidates 320 within each PDCCH monitoring occasion 215 may be different in a first slot 305 where there are two PDCCH monitoring occasions 215-a and 215-b than in a second slot 305 containing four PDCCH monitoring occasions 215. In another example, the maximum number of PDCCH candidates 320 within each PDCCH monitoring occasion 215 may be different in a first slot 305 where each PDCCH monitoring occasion 215-a and 215-b spans three OFDM symbols 310 than in a second slot 305 where each PDCCH monitoring occasion 215-b and 215-b spans four or more OFDM symbols 310. Additionally or alternatively, the maximum number of PDCCH candidates 320 within each PDCCH monitoring occasion 215 may be based on a number of OFDM symbols 310 between each PDCCH monitoring occasions 215.

The maximum number of PDCCH candidates 320 within each PDCCH monitoring occasion 215 may correspond to a number of PDCCH monitoring occasions 215 within the slot 305. The number of PDCCH monitoring occasions 215 may correlate to a number of OFDM symbols 310 between each PDCCH monitoring occasion 215. For example, slot 305 shows two PDCCH monitoring occasions 215-a and 215-b with four OFDM symbols 310 between each monitoring occasion. However, if slot 305 included a third PDCCH monitoring occasion 215, there may be only two OFDM symbols 310 between each of the PDCCH monitoring occasions 215. Here, the UE 115 may have more processing time to decode each of the PDCCH monitoring occasions 215 when there are less PDCCH monitoring occasions 215 within the slot 305. Therefore, in some cases, the number of PDCCH candidates 320 included within each PDCCH monitoring occasions 215 may be based on a processing time for the PDCCH monitoring occasions 215. For example, the maximum number of PDCCH candidates 320 within a PDCCH monitoring occasion 215 may increase as the number of PDCCH monitoring occasions 215 within a slot 305 decreases. Additionally or alternatively, the maximum number of PDCCH candidates 320 within the PDCCH monitoring occasion 215 may increase as the number of PDCCH monitoring occasions 215 within the slot 305 decreases.

In some examples, there may be a limit on the number of PDCCH candidates 320 per slot 305 when there is a first number of PDCCH monitoring occasions 215 in one slot 305, and then a limit on the number of PDCCH candidates 320 per PDCCH monitoring occasion 215 if there is a second number of PDCCH monitoring occasions 215 per slot 305. For instance, a slot-based limit on a number of blind decodes and/or number of non-overlapping CCEs 315 may be configured for two PDCCH monitoring occasions 215 per slot 305, and a per-PDCCH monitoring occasion limit configured for the number of blind decodes and/or the number of non-overlapping CCEs 315 if more frequent monitoring occasion capability is needed (e.g., more PDCCH monitoring occasions 215 per slot 305).

An indirect relationship between the number of PDCCH monitoring occasions 215 within a slot 305 and a number of PDCCH candidates 320 within each PDCCH monitoring occasions 215 may correspond to an amount of processing (e.g., decoding) a UE 115 may do when receiving slot 305 in order to detect control information within the PDCCH monitoring occasions 215. In an example where the number of PDCCH candidates 320 is fixed for each PDCCH monitoring occasion 215, a slot 305 including seven PDCCH monitoring occasions 215 (e.g., one PDCCH monitoring occasion 215 every two consecutive OFDM symbols 310), may require more processing than a slot 305 including two PDCCH monitoring occasions 215 (e.g., one PDCCH monitoring occasion 215 every seven consecutive OFDM symbols 310). In this example, if the PDCCH monitoring occasion 215 that was one of seven PDCCH monitoring occasions 215, the UE 115 may not perform according to a low latency standard (e.g., as indicated by a timing capability of the UE 115). That is, when the slot 305 includes seven PDCCH monitoring occasions 215, a UE 115 may still be processing a first PDCCH monitoring occasion 215 while receiving a second PDCCH monitoring occasion 215. Therefore, the maximum number PDCCH candidates 320 within the PDCCH monitoring occasions 215 that are in one of seven PDCCH monitoring occasions 215 may be less than the maximum number of PDCCH candidates 320 within the PDCCH monitoring occasions 215 that are in one of two PDCCH monitoring occasions 215 within a slot 305.

In another example, the maximum number of PDCCH candidates 320 within each PDCCH monitoring occasion 215 may correspond to a capability of a UE 115. The UE capability may correspond to a maximum number of PDCCH monitoring occasions 215 within the slot 305 that the UE 115 may be able to monitor. The UE 115 may indicate, to the base station 105, the maximum number of PDCCH monitoring occasions 215 that it can monitor within a slot 305. The base station 105 may configure a maximum number of PDCCH candidates 320 for each PDCCH monitoring occasion 215 based on the monitoring capability of the UE 115. That is, if a UE 115 indicates a large maximum number of PDCCH monitoring occasions 215 within a slot 305, the base station 105 may determine that the UE 115 has a high processing power (e.g., corresponding to a relatively fast decoding process). Additionally or alternatively, if the UE 115 indicates a smaller number of maximum number of PDCCH monitoring occasions 215 within the slot 305, the base station 105 may determine that the UE 115 has a relatively low processing power (e.g., corresponding to a relatively slower decoding process). In some cases, the base station 105 may increase a maximum number of PDCCH candidates 320 within each PDCCH monitoring occasion 215 as the indicated number of PDCCH monitoring occasions 215 within a slot 305 increases. Additionally or alternatively, the base station may decrease a maximum number of PDCCH candidates 320 within each PDCCH monitoring occasion 215 as the indicated number of PDCCH monitoring occasions 215 with the slot 305 decreases.

The decoding complexity for each slot 305 may further be limited (e.g., in addition to limiting a maximum number of PDCCH candidates 320 within each PDCCH monitoring occasions 215) by decreasing the decoding complexity of the PDSCH included within each slot 305. In a first example, the PDSCH decoding complexity may be limited by changing one or more of a TBS, rank, MCS, or CCs for the PDSCH. For example, the PDSCH may have a maximum (e.g., a threshold) TBS, rank, MCS, or CCs for the PDSCH in order to decrease the decoding complexity of the PDSCH. Additionally or alternatively, a number of RBs may be limited to decrease decoding complexity of PDSCH and likewise a Fast Fourier Transform (FFT) size may also be limited to decrease decoding complexity of PDSCH. Here, as the threshold for one or more of the TBS, rank, MCS, or CCs for the PDSCH decreases, the maximum decoding complexity for the PDSCH may decrease. For example, if the slot 305 included seven PDCCH monitoring occasions 215 (e.g., one PDCCH monitoring occasion 215 every two OFDM symbol 310). In this example, there may only be one OFDM symbol 310 between each PDCCH monitoring occasion 215. In order to decode the PDCCH monitoring occasions 215 before a next PDCCH monitoring occasion is received, the TBS for the PDSCH within slot 305 may be decreased (e.g., a maximum TBS may be decreased) and the rank may be reduced to ½ (e.g., the maximum rank may be decreased). Therefore, the decoding complexity of the PDSCH may decrease which may further decrease the latency of the communications. In some cases, the maximum values for the TBS, rank, MCS, or CS for the PDSCH may depend on the number of PDCCH monitoring occasions 215. For example, if there are two PDCCH monitoring occasions 215 within slot 305, the maximum values for the TBS, rank, MCS, or CS of the PDSCH may be higher than if there are seven PDCCH monitoring occasions 215 within slot 305.

In some cases, the encoding complexity of PUSCH may also be limited to ensure efficient communications. For example, one or more of a TBS, rank, MCS, or CCs for the PUSCH may be limited. Additionally or alternatively, a number of RBs may be limited to decrease decoding complexity of PUSCH and an FFT size may similarly be limited to decrease decoding complexity of PUSCH.

Additionally or alternatively, a number of PDSCHs included within each slot 305 may be limited (e.g., by a maximum number, by a threshold) in order to limit the decoding complexity of a downlink transmission (e.g., decrease a total number of blind decodes and/or a number of CCEs 315 within each slot 305 for decoding by a UE 115). For example, in a case where each slot 305 includes seven PDCCH monitoring occasions 215 (e.g., the slot 305 includes a PDCCH monitoring occasion 215 in every two consecutive symbols within the slot 305), rather than including seven PDSCHs 220 for the UE 115 to decode, the base station 105 may limit the number of PDSCHs 220 within the slot 305 to two PDSCHs 220. This may decrease the processing required by the UE 115 within each slot 305 of a downlink transmission.

Figure 4:
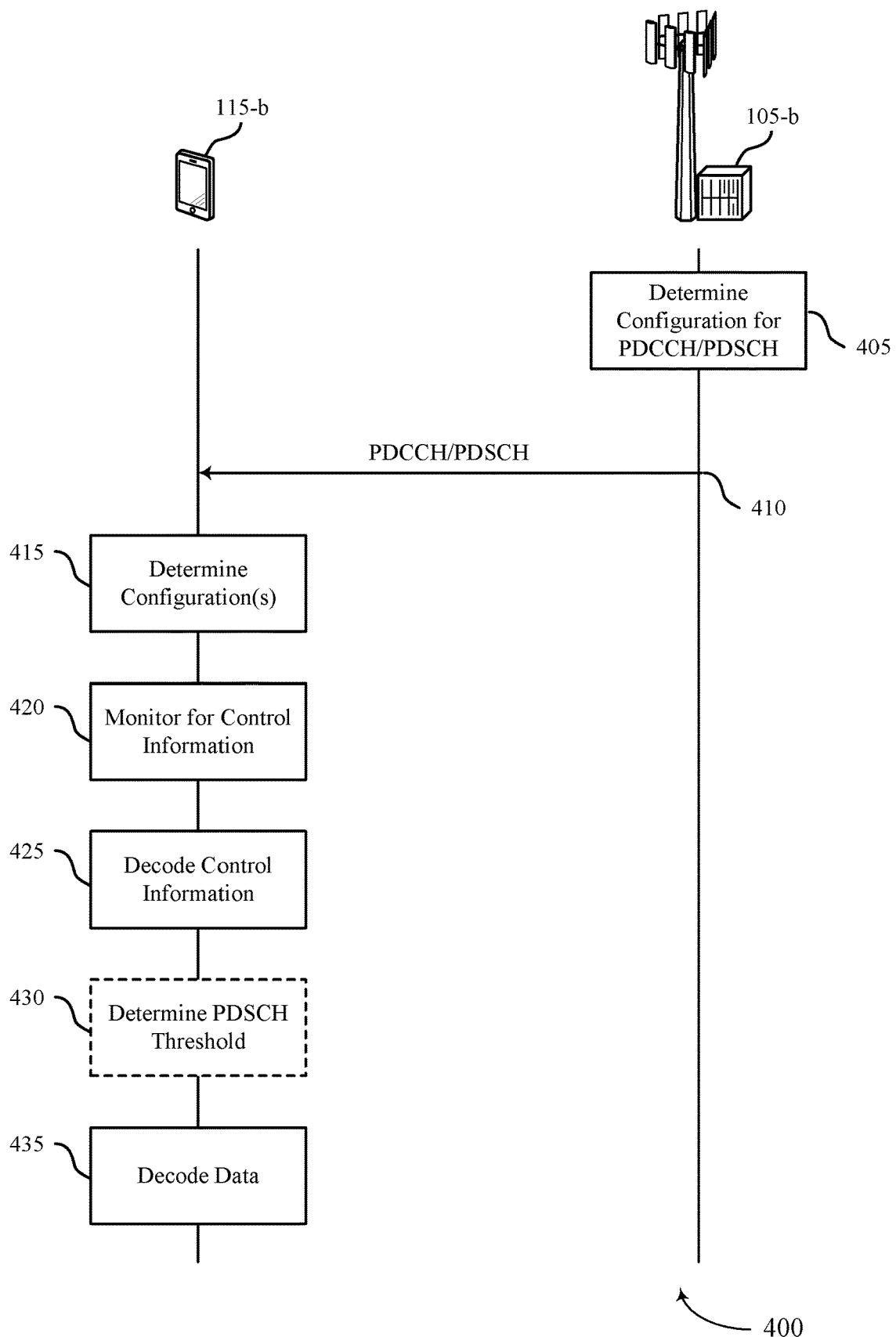
FIGS. 4 and 5 illustrate examples of process flows in accordance with aspects of the present disclosure.

FIG. 4 illustrates an example of a process flow 400 in accordance with aspects of the present disclosure. In some examples, process flow 400 may implement aspects of wireless communications system 100. For instance, process flow 400 may include a UE 115-*b* and base station 105-*b* that may be examples of the corresponding devices described with reference to FIG. 1. Process flow 400 may illustrate techniques used to adjust decoding parameters for the UE 115-*b* such that the UE 115-*b* may efficiently communicate using service types associated with a reliability threshold and a latency threshold or high-priority communications (such as ultra-reliable low latency communications (URLLC), which may be a service based on implicit or explicit indications (e.g., based on network conditions or direct signaling to the UE 115)). For instance, through the adjustment of a maximum number of PDCCH candidates and/or non-overlapping CCEs within each PDCCH monitoring occasion, the UE 115-*b* may avoid being overburdened with attempting a relatively high number of blind decodes for a slot in a short amount of time (e.g., within a single PDCCH monitoring occasion).

At 405, base station 105-*b* may configure the transmission of PDCCH and PDSCH for UE 115-*b*. For instance, the configuration may include time-frequency resources used to carry PDCCH and PDSCH, a number of PDCCH monitoring occasions UE 115-*b* for identifying DCI within the PDCCH, a number of blind decodes and/or non-overlapping CCEs within each PDCCH monitoring occasion, and the like. In some cases, base station 105-*b* may limit the number of blind decodes and/or non-overlapping CCEs within a slot, and may further limit the number of blind decodes and/or non-overlapping CCEs within each PDCCH monitoring occasion. The limit (e.g., threshold) placed on the number blind decodes and/or non-overlapping CCEs within each PDCCH monitoring occasion may enable UE 115-*b* to efficiently search for and decode DCI identified within a number of search space candidates. For instance, the limit may enable UE 115-*b* to perform channel estimation on a number of CCEs and perform a number of blind decodes within a relatively short period of time (e.g., a single PDCCH monitoring occasion), without straining the capabilities of UE 115-*b*. As such, communications between UE 115-*b* and base station 105-*b* may employ communications schemes having low latency and/or high reliability.

In some cases, base station 105-*b* may determine the configuration of the maximum number of blind decodes and/or non-overlapping CCEs within a PDCCH monitoring occasion based, at least in part, on a capability of UE 115-*b*. UE 115-*b* may accordingly transmit an indication of its capabilities to base station 105-*b*, and a set of parameters associated with capabilities of UE 115-*b* may be used to identify a limit on the number of blind decodes and/or non-overlapping CCEs within a PDCCH monitoring occasion. In some examples, the UE capability indicated by UE 115-*b* may include a maximum number of monitoring occasions within a TTI (e.g., a slot) that UE 115-*b* may support.

Additionally or alternatively, UE 115-*b* may report the maximum number of number of blind decodes and/or non-overlapping CCEs within a PDCCH monitoring occasion UE 115-*b* may support. Other examples of UE capabilities associated with the ability of UE 115-*b* to decode PDCCH and or PDSCH may also be indicated.

At 410, base station 105-*b* may transmit, and UE 115-*b* may receive, a transmission of PDCCH and/or PDSCH. At 415, UE 115-*b* may determine a first configuration for a set of PDCCH monitoring occasions during a TTI (e.g., a slot). The first configuration may include a threshold number of PDCCH candidates, or a threshold number of non-overlapping CCEs (or both) within each PDCCH monitoring occasion of the set of PDCCH monitoring occasions. That is, UE 115-*b* may identify a limit on the number of blind decodes/non-overlapping CCEs per PDCCH monitoring occasion. Additionally, UE 115-*b* may determine a second configuration for monitoring the set of PDCCH monitoring occasions, where the second configuration includes a threshold number of PDCCH candidates, or a threshold number of non-overlapping CCEs (or both) within the TTI.

The first configuration and the second configuration may be associated with each other such that, for example, the threshold number of blind decodes of the first configuration (e.g., per PDCCH monitoring occasion) may not exceed the threshold number of blind decodes of the second configuration (e.g., per slot). However, the first configuration may provide benefits to UE 115-*b* for certain types of wireless communications (e.g., URLLC) and the number of decoding occasions within a transmission of PDCCH may preferably be configured using the first configuration over the second configuration. The UE 115-*b* may determine the first and/or second configuration by processing configuration information (e.g., configuration information received from base station 105-*b* prior to receiving the transmission of PDCCH and/or PDSCH).

In some cases, the limit on the number of blind decodes/non-overlapping CCEs within each PDCCH monitoring occasion may be fixed. In such cases, for a pre-determined UE 115 capability (e.g., a timing capability), the number of blind decodes/CCEs per PDCCH monitoring occasion may be adjusted (e.g., relaxed) to enable improved decoding processing time at UE 115-*b*. Additionally or alternatively, the limit on the number of blind decodes/non-overlapping CCEs within each PDCCH monitoring occasion may be based on the number of PDCCH monitoring occasions per TTI. In such cases, the threshold of blind decodes and/or non-overlapping CCEs may be inversely proportional to the number of monitoring occasions. In this way, as the number of PDCCH monitoring occasions increase, the limit on blind decodes and/or non-overlapping CCEs within each PDCCH monitoring occasion may decrease. Thus, with more monitoring occasions, UE 115-*b* may perform less "work" (e.g., channel estimation and/or blind decodes) during each PDCCH monitoring occasion, and vice versa.

In other examples, the limit on the number of blind decodes/non-overlapping CCEs within each PDCCH monitoring occasion may be based on the capabilities of UE 115-*b*. In such cases, UE 115-*b* may be able to support a relatively high number of PDCCH monitoring occasions per TTI and be capable of processing a high number of blind decodes/non-overlapping CCEs within each PDCCH monitoring occasion. As such, the first configuration may accordingly provide for an adjusted (e.g., increased) number of blind decodes/non-overlapping CCEs within each PDCCH monitoring occasion that matches the capabilities of UE 115-*b*. In other examples, another UE 115 with lesser capabilities than UE 115-*b* may accordingly be configured with a lower number of blind decodes/non-overlapping CCEs within each PDCCH monitoring occasion, based on the capability of the other UE 115.

At 420, UE 115-*b* may monitor, in accordance with the first configuration and/or the second configuration, for control information during the set of PDCCH monitoring occasions. Additionally, at 425, UE 115-*b* may decode control information identified within at least one PDCCH monitoring occasion of the set of PDCCH monitoring occasions.

At 430, UE 115-*b* may optionally determine a threshold number of PDSCHs within the TTI, where the number of PDSCHs may be limited based, at least in part, on the number of PDCCH decoding occasions within each PDCCH monitoring occasion. In such cases, the limited number of PDSCHs may serve to further relax the decoding burden on UE 115-*b*, which may in turn further enable UE 115-*b* to satisfy reliability and latency thresholds associated with a service type. At 435, UE 115-*b* may accordingly decode data from one or more PDSCHs within the TTI based on determining the threshold number of PDSCHs.

Figure 5:
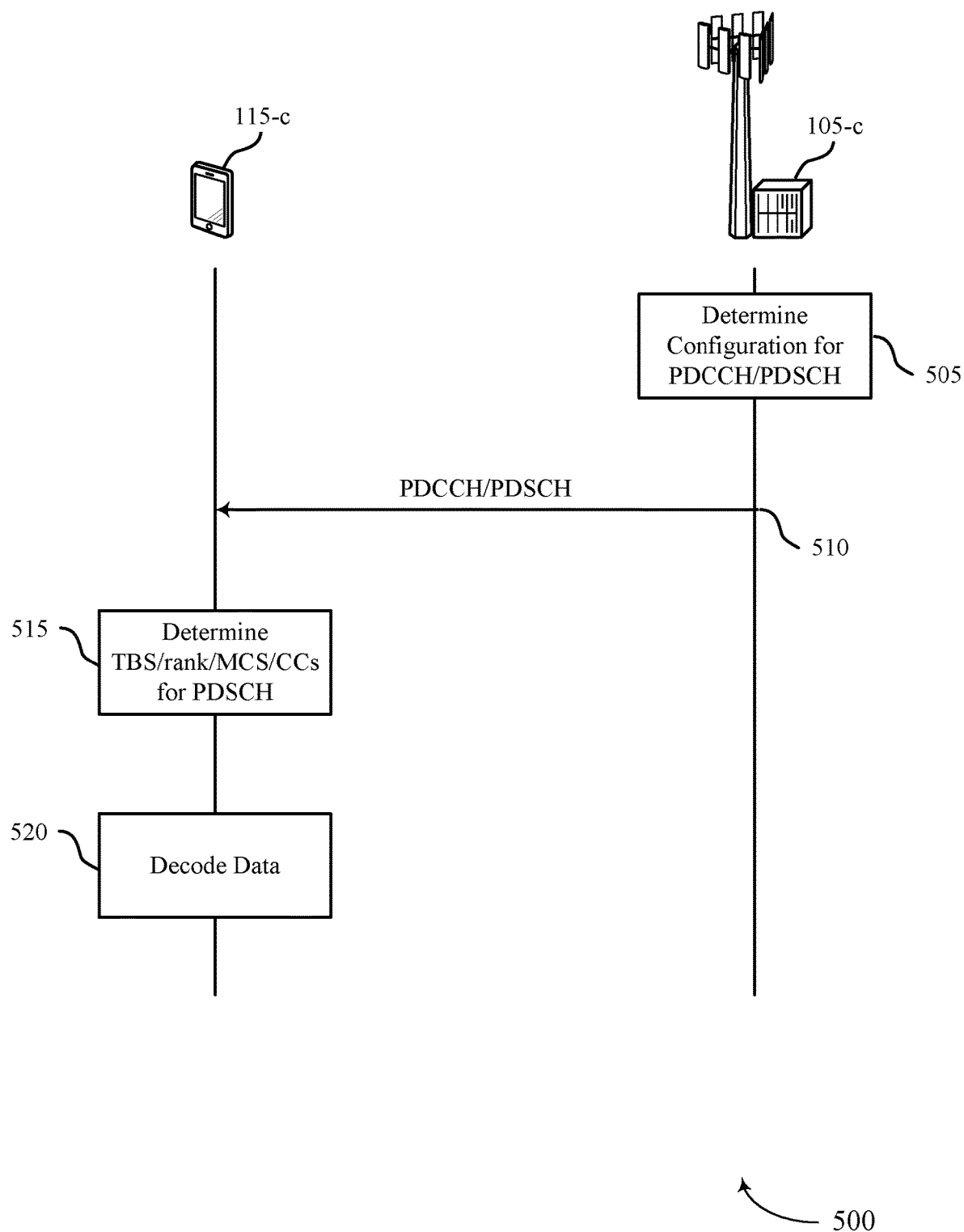

FIG. 5 illustrates an example of a process flow 500 in accordance with aspects of the present disclosure. In some examples, process flow 500 may implement aspects of wireless communications system 100. For instance, process flow 500 may include a UE 115-*c* and base station 105-*c* that may be examples of the corresponding devices described with reference to FIG. 1. Process flow 500 may illustrate techniques used to adjust decoding parameters for a UE 115 such that the UE 115 may efficiently communicate using service types associated with a reliability threshold and a latency threshold (such as URLLC). For instance, through the adjustment of a PDSCH transmission, the UE 115 may avoid being overburdened with decoding the PDSCH, particularly when the UE 115 may have to contend with decoding other signals sent by the base station (e.g., PDCCH).

At 505, base station 105-*c* may configure the transmission of PDCCH and PDSCH for UE 115-*c*. For instance, the configuration may include time-frequency resources used to carry PDCCH and PDSCH, a number of PDCCH monitoring occasions UE 115-*c* for identifying DCI within the PDCCH, a number of blind decodes and/or non-overlapping CCEs within each PDCCH monitoring occasion, and the like. Additionally, base station 105-*c* may configure, for PDSCH, an limit on the TBS, rank, MCS, number of CCs, or a combination thereof. Other adjustments to the characteristics or parameters of the PDSCH may also be adjusted and/or limited. For instance, depending on the transmission scenario (e.g., the number of PDCCH monitoring occasions, the number of PDSCHs, etc.), base station 105-*c* may adjust one of a TBS, rank, MCS, number of CCs, or the like, such that UE 115-*c* may have a lesser decoding burden when decoding data within the PDSCH. Accordingly, the limit on these transmission parameters may enable efficient communications by avoiding burdening processing by UE 115-*c*.

At 510, base station 105-*c* may transmit, and UE 115-*c* may receive, a transmission of PDCCH and/or PDSCH. At 515, UE 115-*c* may determine a threshold associated with the TBS for the PDSCH, a rank for the PDSCH, an MCS for the PDSCH, or a number of CCs for the PDSCH, or a combination thereof. At 515, UE 115-*c* may decode data within the PDSCH based on the limit (e.g., threshold) placed on the TBS for the PDSCH, rank for the PDSCH, MCS for the PDSCH, or the number of CCs for the PDSCH, or a combination thereof.

Figure 6:
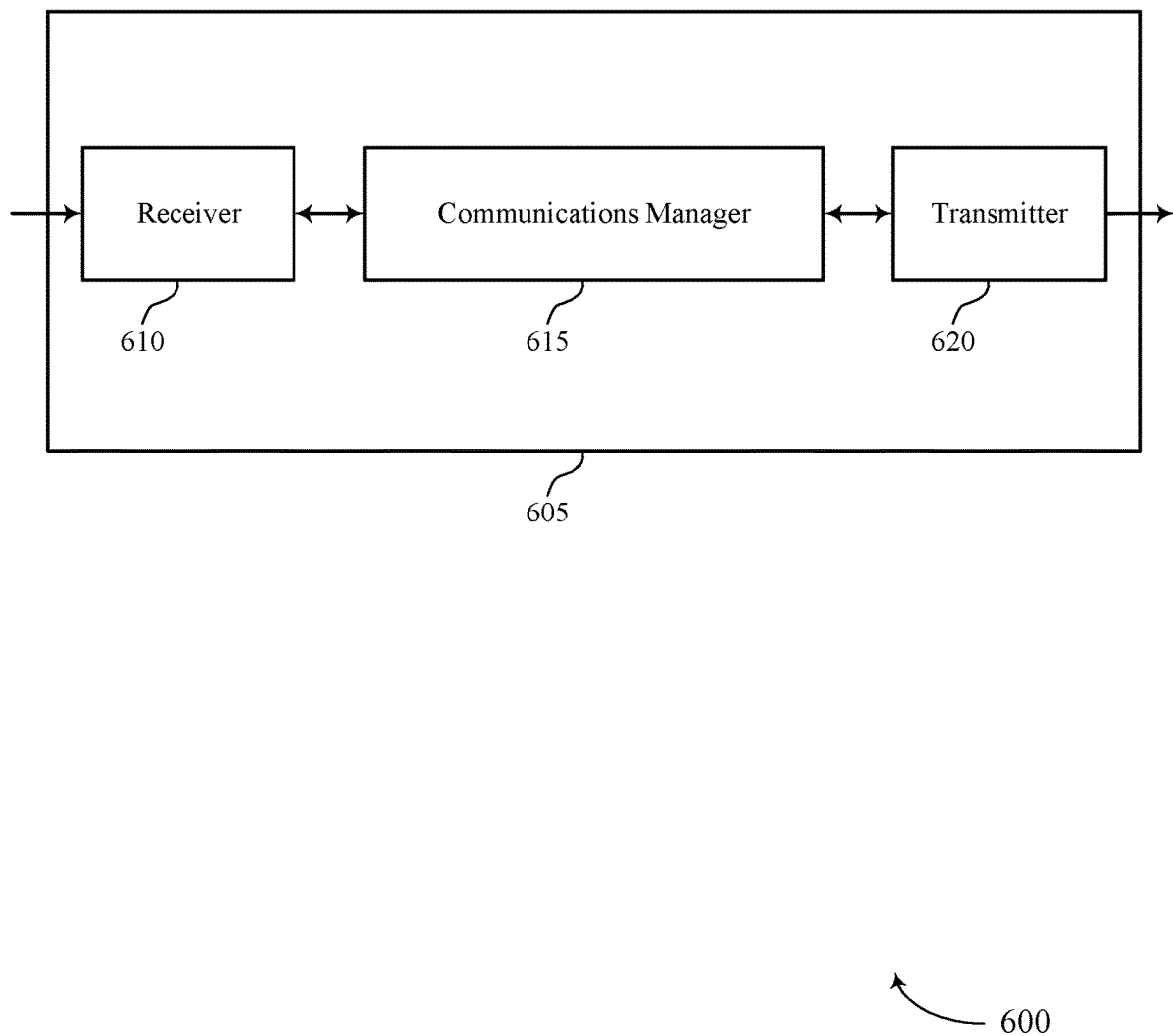
FIGS. 6 and 7 show block diagrams of devices in accordance with aspects of the present disclosure.

FIG. 6 shows a block diagram 600 of a device 605 in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to downlink control channel monitoring capabilities, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions. The communications manager 615 may further determine a second configuration for monitoring the set of PDCCH monitoring occasions, the second configuration including a threshold number of PDCCH candidates, or a threshold number of non-overlapping CCEs, or a combination thereof, within the slot. The communications manager 615 may monitor, in accordance with the first configuration and the second configuration, for control information during the set of PDCCH monitoring occasions, and decode the control information identified within at least one PDCCH monitoring occasion of the set of PDCCH monitoring occasions.

In some examples, the communications manager 615 may determine a configuration for a set of PDCCH monitoring occasions within a slot and determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions. The communications manager 615 may further monitor, in accordance with the configuration, for control information during the set of PDCCH monitoring occasions, and decode the control information identified within at least one PDCCH monitoring occasion of the set of PDCCH monitoring occasions.

In some other examples, the communications manager 615 may determine a configuration for a set of PDCCH monitoring occasions within a slot, and determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability. The communications manager 615 may monitor, in accordance with the configuration, for control information during the set of PDCCH monitoring occasions, and decode the control information identified within at least one PDCCH monitoring occasion of the set of PDCCH monitoring occasions. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The actions performed by the communications manager 615 as described herein may be implemented to realize one or more potential advantages. One implementation may allow a UE 115 increase power efficiency by defining a threshold number of PDCCH candidates or non-overlapping CCEs. That is, the UE 115 may limit a quantity of monitored PDCCH candidates or non-overlapping CCEs to the threshold number of PDCCH candidates or non-overlapping CCEs, thus limiting power consumption. Another implementation may provide decreased latency at the UE 115 resulting from a decreased decoding complexity at the UE 115. The maximum number of PDCCHs may limit a decoding complexity (and corresponding processing time) of each PDCCH monitoring occasion.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
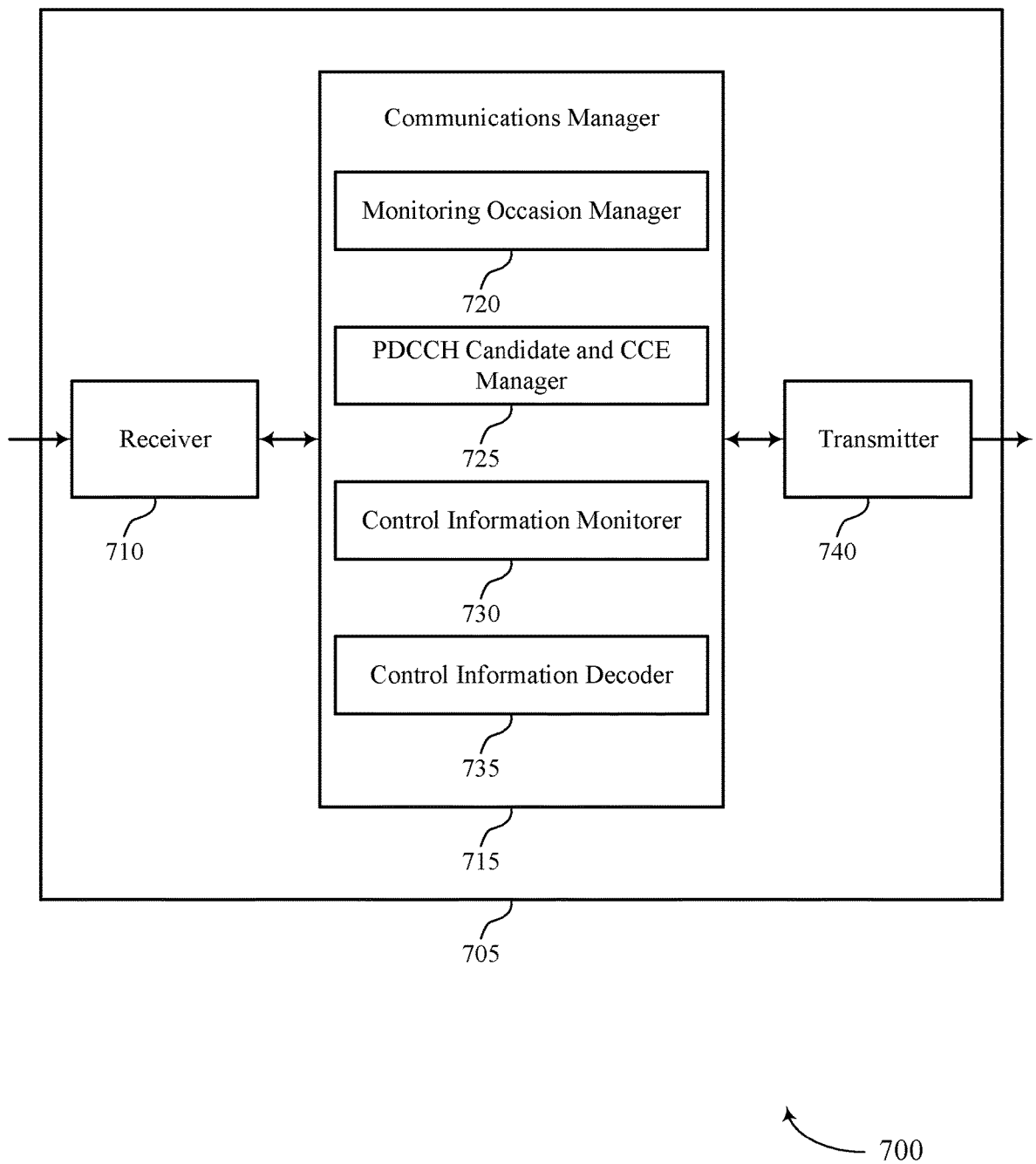

FIG. 7 shows a block diagram 700 of a device 705 in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to downlink control channel monitoring capabilities, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a monitoring occasion manager 720, a PDCCH candidate and CCE manager 725, a control information monitor 730, and a control information decoder 735. The communications manager 715 may be an example of aspects of the communications manager 910 described herein.

The monitoring occasion manager 720 may determine a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions. The PDCCH candidate and CCE manager 725 may determine a second configuration for monitoring the set of PDCCH monitoring occasions, the second configuration including a threshold number of PDCCH candidates, or a threshold number of non-overlapping CCEs, or a combination thereof, within the slot. The control information monitor 730 may monitor, in accordance with the first configuration and the second configuration, for control information during the set of PDCCH monitoring occasions. The control information decoder 735 may decode the control information identified within at least one PDCCH monitoring occasion of the set of PDCCH monitoring occasions.

The monitoring occasion manager 720 may determine a configuration for a set of PDCCH monitoring occasions within a slot. The PDCCH candidate and CCE manager 725 may determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions. The control information monitor 730 may monitor, in accordance with the configuration, for control information during the set of PDCCH monitoring occasions. The control information decoder 735 may decode the control information identified within at least one PDCCH monitoring occasion of the set of PDCCH monitoring occasions.

The monitoring occasion manager 720 may determine a configuration for a set of PDCCH monitoring occasions within a slot. The PDCCH candidate and CCE manager 725 may determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability. The control information monitor 730 may monitor, in accordance with the configuration, for control information during the set of PDCCH monitoring occasions. The control information decoder 735 may decode the control information identified within at least one PDCCH monitoring occasion of the set of PDCCH monitoring occasions.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
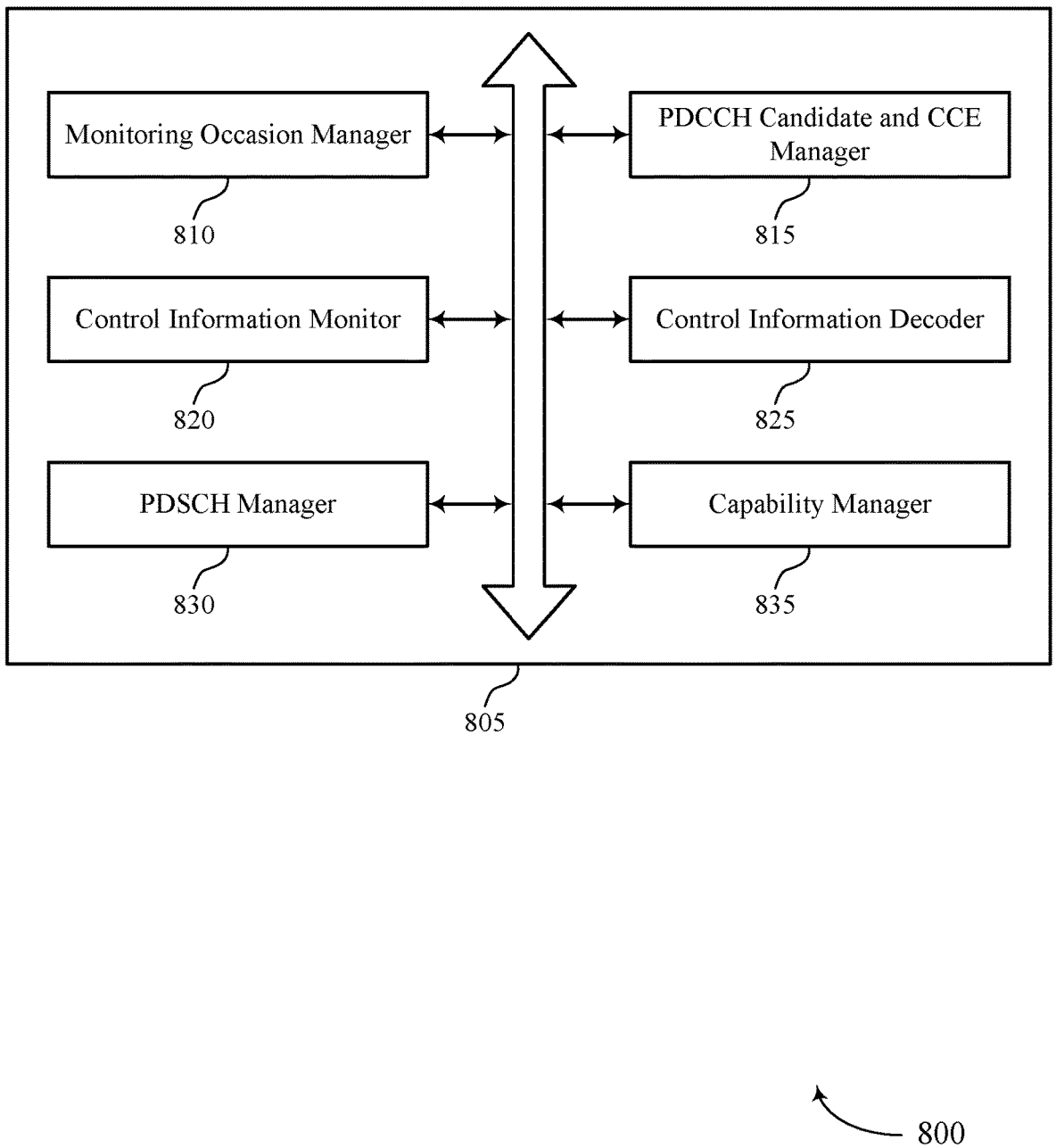
FIG. 8 shows a block diagram of a communications manager in accordance with aspects of the present disclosure.

FIG. 8 shows a block diagram 800 of a communications manager 805 in accordance with aspects of the present disclosure. The communications manager 805 may be an example of aspects of a communications manager 615, a communications manager 715, or a communications manager 910 described herein. The communications manager 805 may include a monitoring occasion manager 810, a PDCCH candidate and CCE manager 815, a control information monitor 820, a control information decoder 825, a PDSCH manager 830, and a capability manager 835. Each of these modules may communicate, directly or indirectly, with one another (e.g., via one or more buses).

The monitoring occasion manager 810 may determine a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions.

The PDCCH candidate and CCE manager 815 may determine a second configuration for monitoring the set of PDCCH monitoring occasions, the second configuration including a threshold number of PDCCH candidates, or a threshold number of non-overlapping CCEs, or a combination thereof, within the slot. In some cases, the threshold number of PDCCH candidates, or the threshold number of non-overlapping CCEs, or both, within each PDCCH monitoring occasion is fixed. In some examples, the threshold number of PDCCH candidates, or the threshold number of non-overlapping CCEs, or a combination thereof, is based on the threshold number of PDSCHs.

The control information monitor 820 may monitor, in accordance with the first configuration and the second configuration, for control information during the set of PDCCH monitoring occasions. The control information decoder 825 may decode the control information identified within at least one PDCCH monitoring occasion of the set of PDCCH monitoring occasions.

The PDSCH manager 830 may determine a threshold number of PDSCH within the slot based on a number of PDCCH decoding occasions within each PDCCH monitoring occasion of the set. In some examples, the PDSCH manager 830 may decode data from one or more PDSCHs within the slot based on determining the threshold number of PDSCHs. In some cases, the PDSCH manager 830 may decode a PDSCH within the slot based on a threshold associated with a TBS for the PDSCH, a rank for the PDSCH, an MCS for the PDSCH, or a number of CCs for the PDSCH, or a combination thereof.

The monitoring occasion manager 810 may determine a configuration for a set of PDCCH monitoring occasions within a slot. The PDCCH candidate and CCE manager 815 may determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions. In some cases, the threshold number of PDCCH candidates, or the threshold number of non-overlapping CCEs, or both, within each PDCCH monitoring occasion is inversely proportional to the number of PDCCH monitoring occasions. In some examples, the threshold number of PDCCH candidates, or the threshold number of non-overlapping CCEs, or a combination thereof, is based on the threshold number of PDSCHs. The control information monitor 820 may monitor, in accordance with the configuration, for control information during the set of PDCCH monitoring occasions. The control information decoder 825 may decode the control information identified within at least one PDCCH monitoring occasion of the set of PDCCH monitoring occasions.

The PDSCH manager 830 may decode a PDSCH within the slot based on a threshold associated with a TBS for the PDSCH, a rank for the PDSCH, an MCS for the PDSCH, or a number of CCs for the PDSCH, or a combination thereof. In some examples, the PDSCH manager 830 may determine a threshold number of PDSCH within the slot based on a number of PDCCH decoding occasions within each PDCCH monitoring occasion of the set. In some instances, the PDSCH manager 830 may decode data from one or more PDSCHs within the slot based on determining the threshold number of PDSCHs. The monitoring occasion manager 810 may determine a configuration for a set of PDCCH monitoring occasions within a slot.

The PDCCH candidate and CCE manager 815 may determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability. In some examples, the PDCCH candidate and CCE manager 815 may identify, based on the UE capability, a set of parameters corresponding to the threshold number of PDCCH candidates, or the threshold number of non-overlapping CCEs, or both. In some cases, the threshold number of PDCCH candidates, or the threshold number of non-overlapping CCEs, or both, within each PDCCH monitoring occasion is proportional to a number of PDCCH monitoring occasions within the slot. In some cases, the threshold number of PDCCH candidates, or the threshold number of non-overlapping CCEs, or a combination thereof, is based on the threshold number of PDSCHs.

In some examples, the control information monitor 820 may monitor, in accordance with the configuration, for control information during the set of PDCCH monitoring occasions. The control information decoder 825 may decode the control information identified within at least one PDCCH monitoring occasion of the set of PDCCH monitoring occasions.

The PDSCH manager 830 may determine a threshold number of PDSCH within the slot based on a number of PDCCH decoding occasions within each PDCCH monitoring occasion of the set. In some examples, the PDSCH manager 830 may decode data from one or more PDSCHs within the slot based on determining the threshold number of PDSCHs. In some cases, the PDSCH manager 830 may decode a PDSCH within the slot based on a threshold associated with a TBS for the PDSCH, a rank for the PDSCH, an MCS for the PDSCH, or a number of CCs for the PDSCH, or a combination thereof. The capability manager 835 may transmit, to a base station, an indication of the UE capability. In some cases, the UE capability includes a maximum number of PDCCH monitoring occasions supported by a UE.

Figure 9:
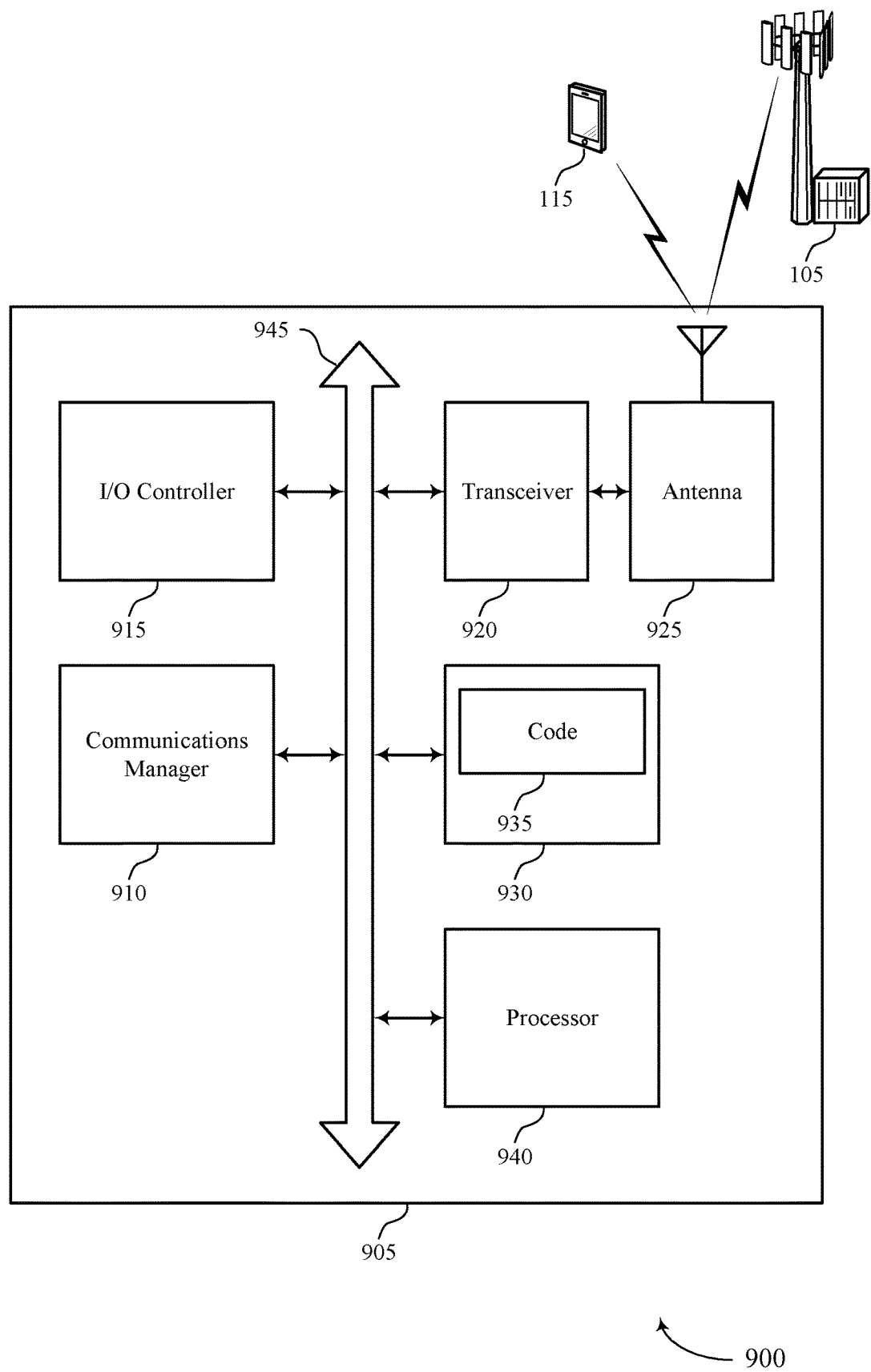
FIG. 9 shows a diagram of a system including a device in accordance with aspects of the present disclosure.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions. The communications manager 910 may also determine a second configuration for monitoring the set of PDCCH monitoring occasions, the second configuration including a threshold number of PDCCH candidates, or a threshold number of non-overlapping CCEs, or a combination thereof, within the slot. In some instances, the communications manager 910 may monitor, in accordance with the first configuration and the second configuration, for control information during the set of PDCCH monitoring occasions, and decode the control information identified within at least one PDCCH monitoring occasion of the set of PDCCH monitoring occasions.

The communications manager 910 may determine a configuration for a set of PDCCH monitoring occasions within a slot and determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions. The communications manager 910 may also monitor, in accordance with the configuration, for control information during the set of PDCCH monitoring occasions, and decode the control information identified within at least one PDCCH monitoring occasion of the set of PDCCH monitoring occasions.

The communications manager 910 may determine a configuration for a set of PDCCH monitoring occasions within a slot, and determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability. The communications manager 910 may also monitor, in accordance with the configuration, for control information during the set of PDCCH monitoring occasions, and decode the control information identified within at least one PDCCH monitoring occasion of the set of PDCCH monitoring occasions.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the transceiver 920 may be configured to receive a set of signals including one or more PDSCHs, PDCCHs, etc.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting downlink control channel monitoring capabilities).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
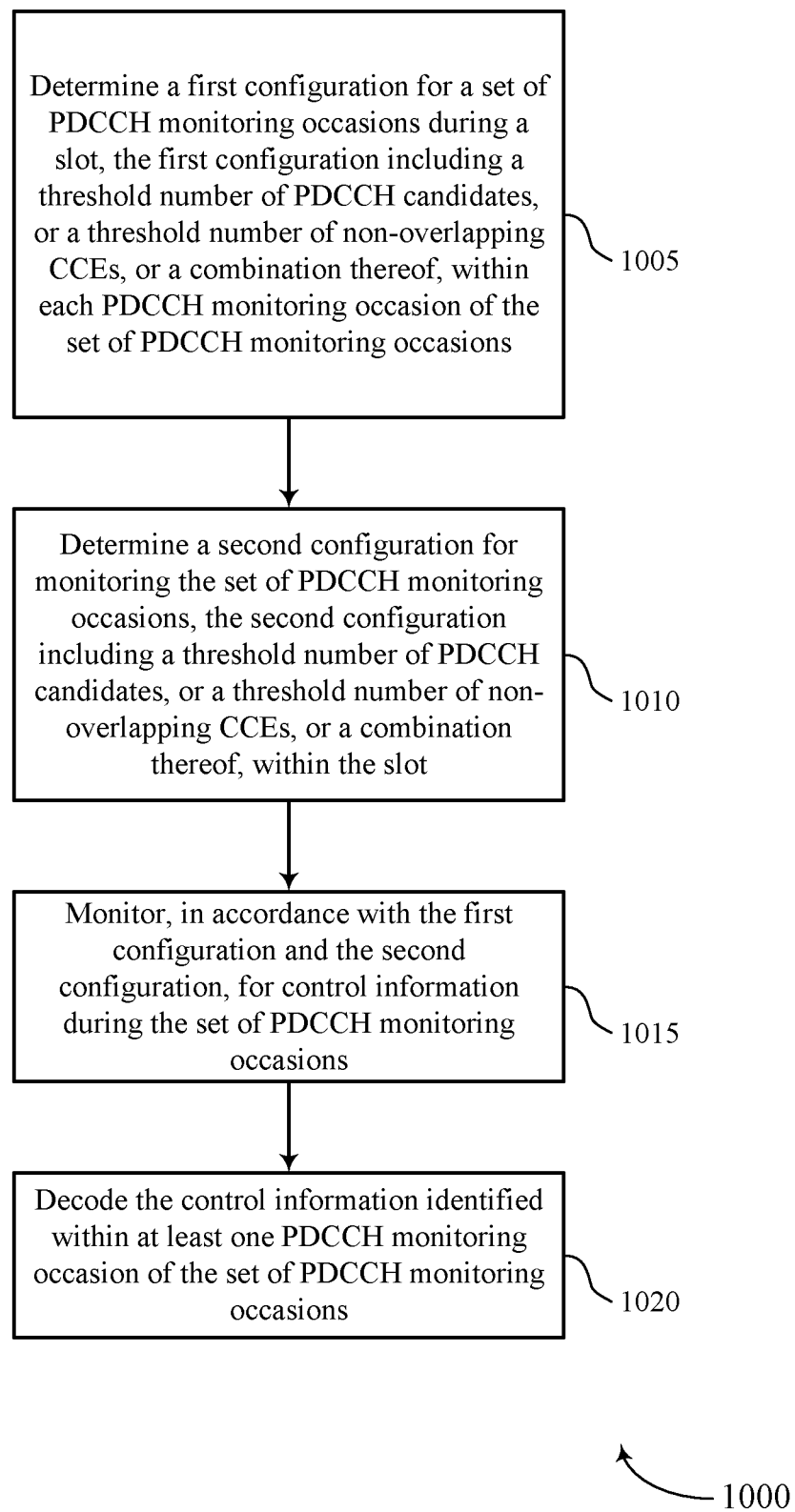
FIGS. 10 through 15 show flowcharts illustrating methods in accordance with aspects of the present disclosure.

FIG. 10 shows a flowchart illustrating a method 1000 in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may determine a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions. The operations of 1005 may be performed according to the methods described herein. In some examples, aspects of the operations of 1005 may be performed by a monitoring occasion manager as described with reference to FIGS. 6 through 9.

At 1010, the UE may determine a second configuration for monitoring the set of PDCCH monitoring occasions, the second configuration including a threshold number of PDCCH candidates, or a threshold number of non-overlapping CCEs, or a combination thereof, within the slot. The operations of 1010 may be performed according to the methods described herein. In some examples, aspects of the operations of 1010 may be performed by a PDCCH candidate and CCE manager as described with reference to FIGS. 6 through 9.

At 1015, the UE may monitor, in accordance with the first configuration and the second configuration, for control information during the set of PDCCH monitoring occasions. The operations of 1015 may be performed according to the methods described herein. In some examples, aspects of the operations of 1015 may be performed by a control information monitor as described with reference to FIGS. 6 through 9.

At 1020, the UE may decode the control information identified within at least one PDCCH monitoring occasion of the set of PDCCH monitoring occasions. The operations of 1020 may be performed according to the methods described herein. In some examples, aspects of the operations of 1020 may be performed by a control information decoder as described with reference to FIGS. 6 through 9.

Figure 11:
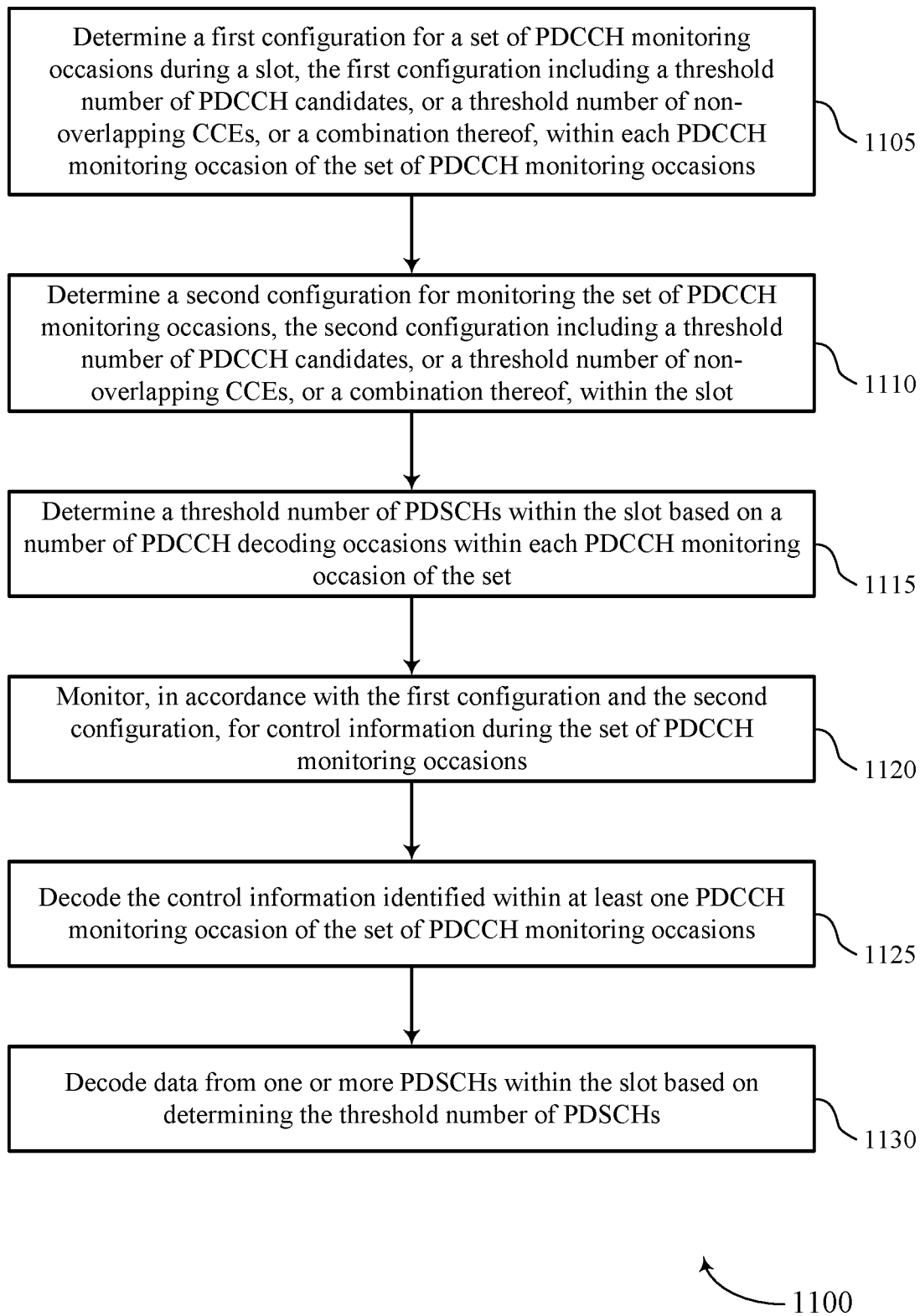

FIG. 11 shows a flowchart illustrating a method 1100 in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may determine a first configuration for a set of PDCCH monitoring occasions during a slot, the first configuration including a threshold number of PDCCH candidates, or a threshold number of non-overlapping CCEs, or a combination thereof, within each PDCCH monitoring occasion of the set of PDCCH monitoring occasions. The operations of 1105 may be performed according to the methods described herein. In some examples, aspects of the operations of 1105 may be performed by a monitoring occasion manager as described with reference to FIGS. 6 through 9.

At 1110, the UE may determine a second configuration for monitoring the set of PDCCH monitoring occasions, the second configuration including a threshold number of PDCCH candidates, or a threshold number of non-overlapping CCEs, or a combination thereof, within the slot. The operations of 1110 may be performed according to the methods described herein. In some examples, aspects of the operations of 1110 may be performed by a PDCCH candidate and CCE manager as described with reference to FIGS. 6 through 9.

At 1115, the UE may determine a threshold number of PDSCH within the slot based on a number of PDCCH decoding occasions within each PDCCH monitoring occasion of the set. The operations of 1115 may be performed according to the methods described herein. In some examples, aspects of the operations of 1115 may be performed by a PDSCH manager as described with reference to FIGS. 6 through 9.

At 1120, the UE may monitor, in accordance with the first configuration and the second configuration, for control information during the set of PDCCH monitoring occasions. The operations of 1120 may be performed according to the methods described herein. In some examples, aspects of the operations of 1120 may be performed by a control information monitor as described with reference to FIGS. 6 through 9.

At 1125, the UE may decode the control information identified within at least one PDCCH monitoring occasion of the set of PDCCH monitoring occasions. The operations of 1125 may be performed according to the methods described herein. In some examples, aspects of the operations of 1125 may be performed by a control information decoder as described with reference to FIGS. 6 through 9.

At 1130, the UE may decode data from one or more PDSCHs within the slot based on determining the threshold number of PDSCHs. The operations of 1130 may be performed according to the methods described herein. In some examples, aspects of the operations of 1130 may be performed by a PDSCH manager as described with reference to FIGS. 6 through 9.

Figure 12:
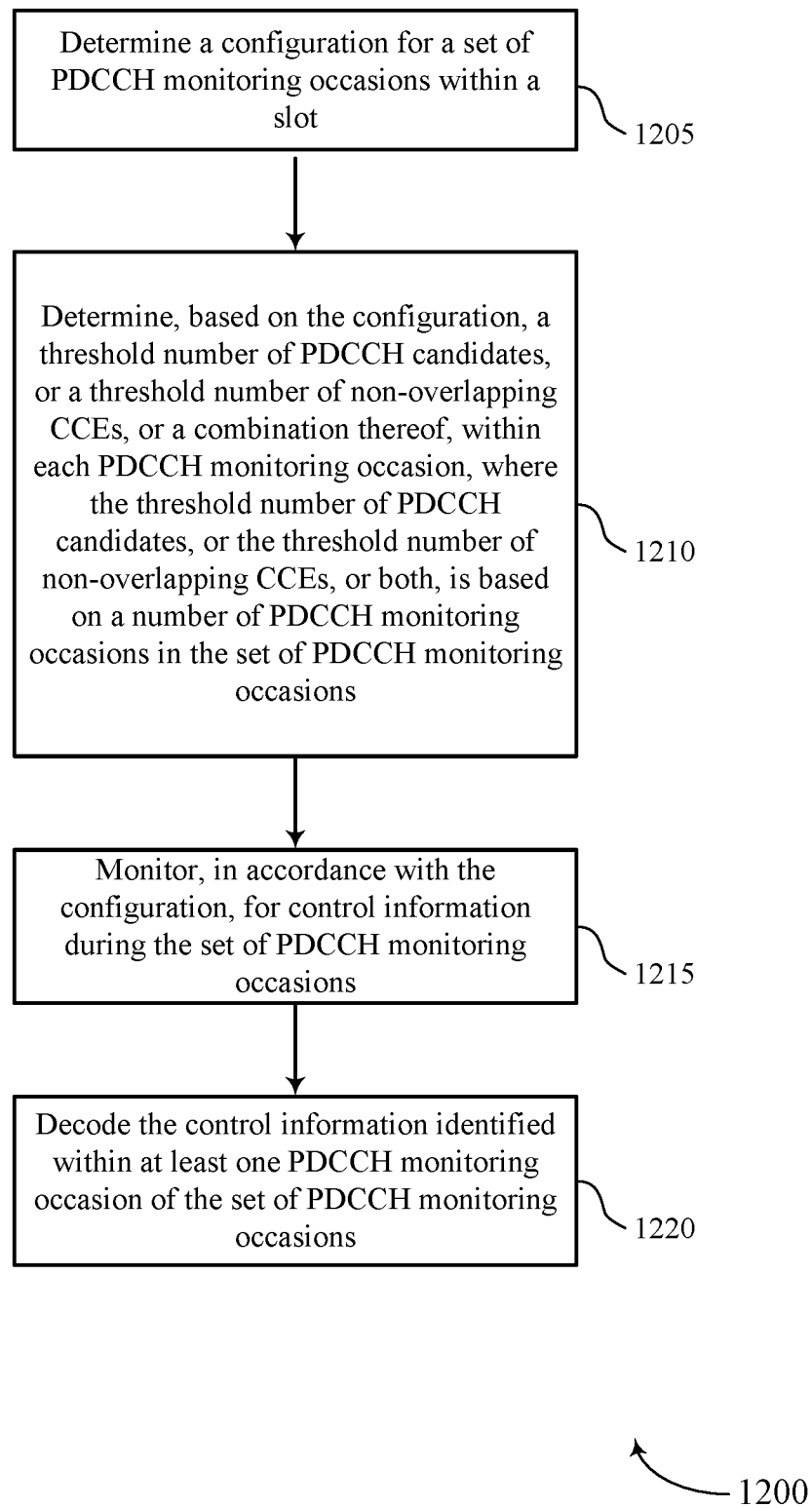

FIG. 12 shows a flowchart illustrating a method 1200 in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may determine a configuration for a set of PDCCH monitoring occasions within a slot. The operations of 1205 may be performed according to the methods described herein. In some examples, aspects of the operations of 1205 may be performed by a monitoring occasion manager as described with reference to FIGS. 6 through 9.

At 1210, the UE may determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions. The operations of 1210 may be performed according to the methods described herein. In some examples, aspects of the operations of 1210 may be performed by a PDCCH candidate and CCE manager as described with reference to FIGS. 6 through 9.

At 1215, the UE may monitor, in accordance with the configuration, for control information during the set of PDCCH monitoring occasions. The operations of 1215 may be performed according to the methods described herein. In some examples, aspects of the operations of 1215 may be performed by a control information monitor as described with reference to FIGS. 6 through 9.

At 1220, the UE may decode the control information identified within at least one PDCCH monitoring occasion of the set of PDCCH monitoring occasions. The operations of 1220 may be performed according to the methods described herein. In some examples, aspects of the operations of 1220 may be performed by a control information decoder as described with reference to FIGS. 6 through 9.

Figure 13:
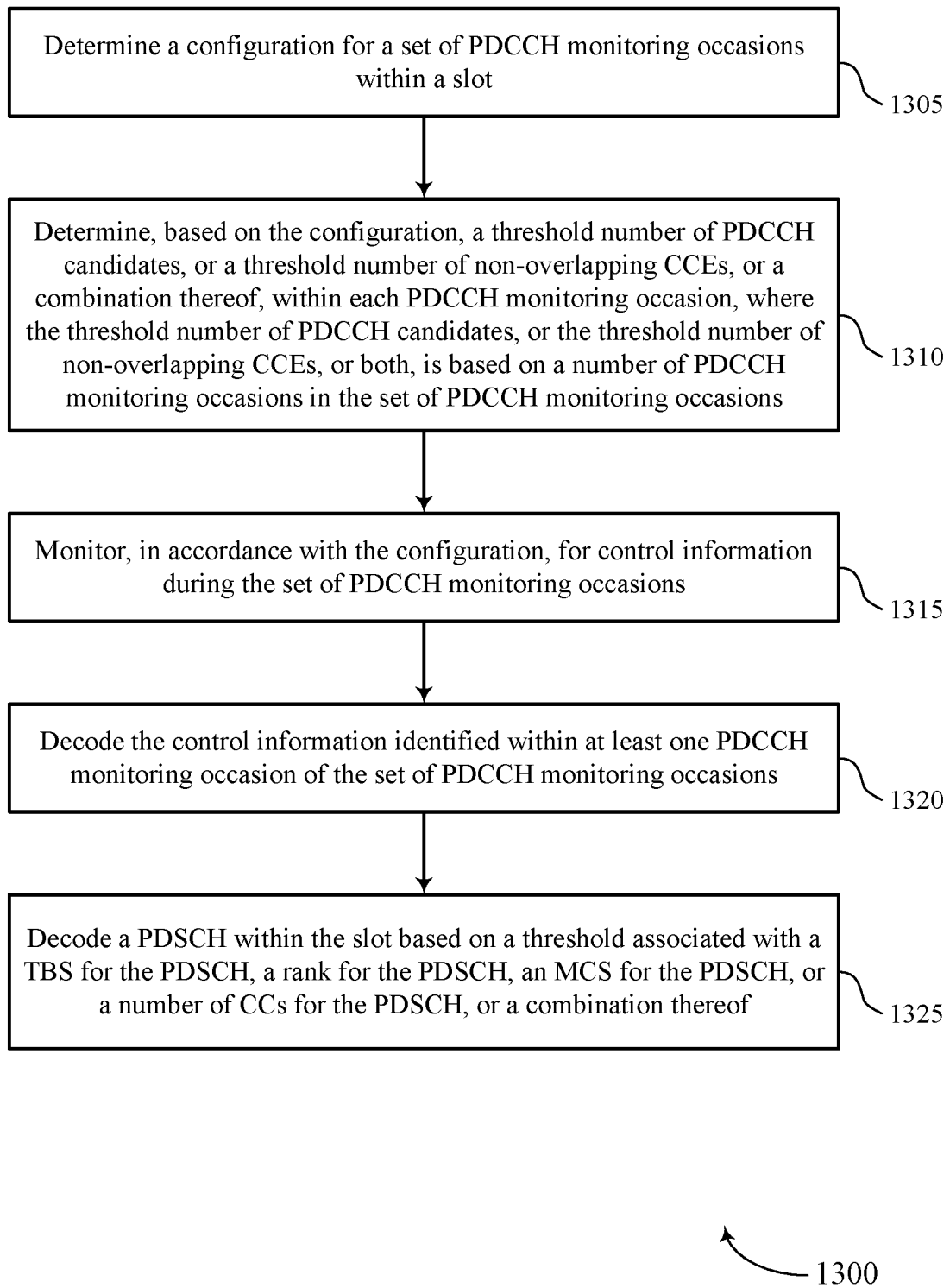

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may determine a configuration for a set of PDCCH monitoring occasions within a slot. The operations of 1305 may be performed according to the methods described herein. In some examples, aspects of the operations of 1305 may be performed by a monitoring occasion manager as described with reference to FIGS. 6 through 9.

At 1310, the UE may determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a number of PDCCH monitoring occasions in the set of PDCCH monitoring occasions. The operations of 1310 may be performed according to the methods described herein. In some examples, aspects of the operations of 1310 may be performed by a PDCCH candidate and CCE manager as described with reference to FIGS. 6 through 9.

At 1315, the UE may monitor, in accordance with the configuration, for control information during the set of PDCCH monitoring occasions. The operations of 1315 may be performed according to the methods described herein. In some examples, aspects of the operations of 1315 may be performed by a control information monitor as described with reference to FIGS. 6 through 9.

At 1320, the UE may decode the control information identified within at least one PDCCH monitoring occasion of the set of PDCCH monitoring occasions. The operations of 1320 may be performed according to the methods described herein. In some examples, aspects of the operations of 1320 may be performed by a control information decoder as described with reference to FIGS. 6 through 9.

At 1325, the UE may decode a PDSCH within the slot based on a threshold associated with a TBS for the PDSCH, a rank for the PDSCH, an MCS for the PDSCH, or a number of CCs for the PDSCH, or a combination thereof. The operations of 1325 may be performed according to the methods described herein. In some examples, aspects of the operations of 1325 may be performed by a PDSCH manager as described with reference to FIGS. 6 through 9.

Figure 14:
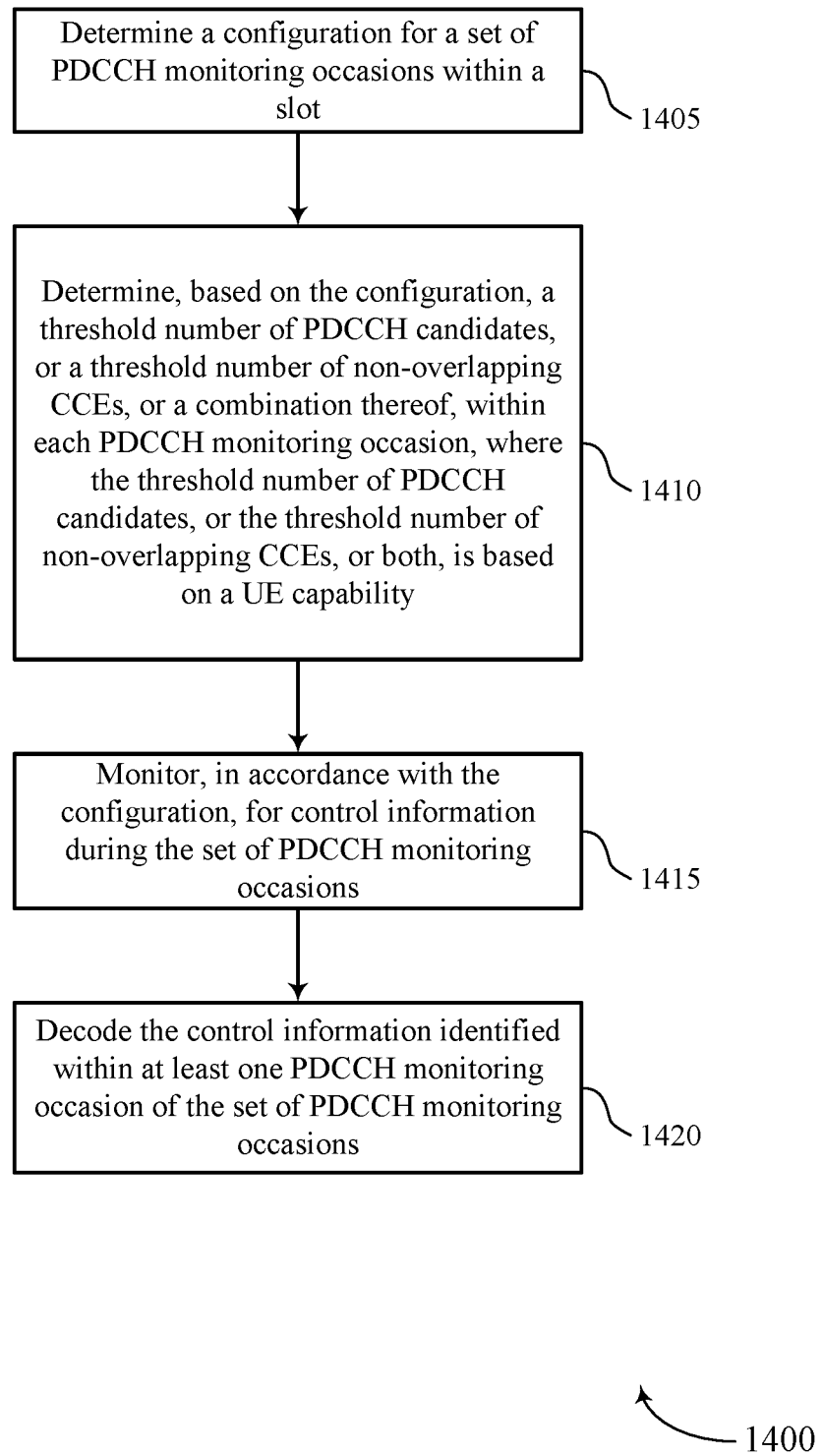

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may determine a configuration for a set of PDCCH monitoring occasions within a slot. The operations of 1405 may be performed according to the methods described herein. In some examples, aspects of the operations of 1405 may be performed by a monitoring occasion manager as described with reference to FIGS. 6 through 9.

At 1410, the UE may determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability. The operations of 1410 may be performed according to the methods described herein. In some examples, aspects of the operations of 1410 may be performed by a PDCCH candidate and CCE manager as described with reference to FIGS. 6 through 9.

At 1415, the UE may monitor, in accordance with the configuration, for control information during the set of PDCCH monitoring occasions. The operations of 1415 may be performed according to the methods described herein. In some examples, aspects of the operations of 1415 may be performed by a control information monitor as described with reference to FIGS. 6 through 9.

At 1420, the UE may decode the control information identified within at least one PDCCH monitoring occasion of the set of PDCCH monitoring occasions. The operations of 1420 may be performed according to the methods described herein. In some examples, aspects of the operations of 1420 may be performed by a control information decoder as described with reference to FIGS. 6 through 9.

Figure 15:
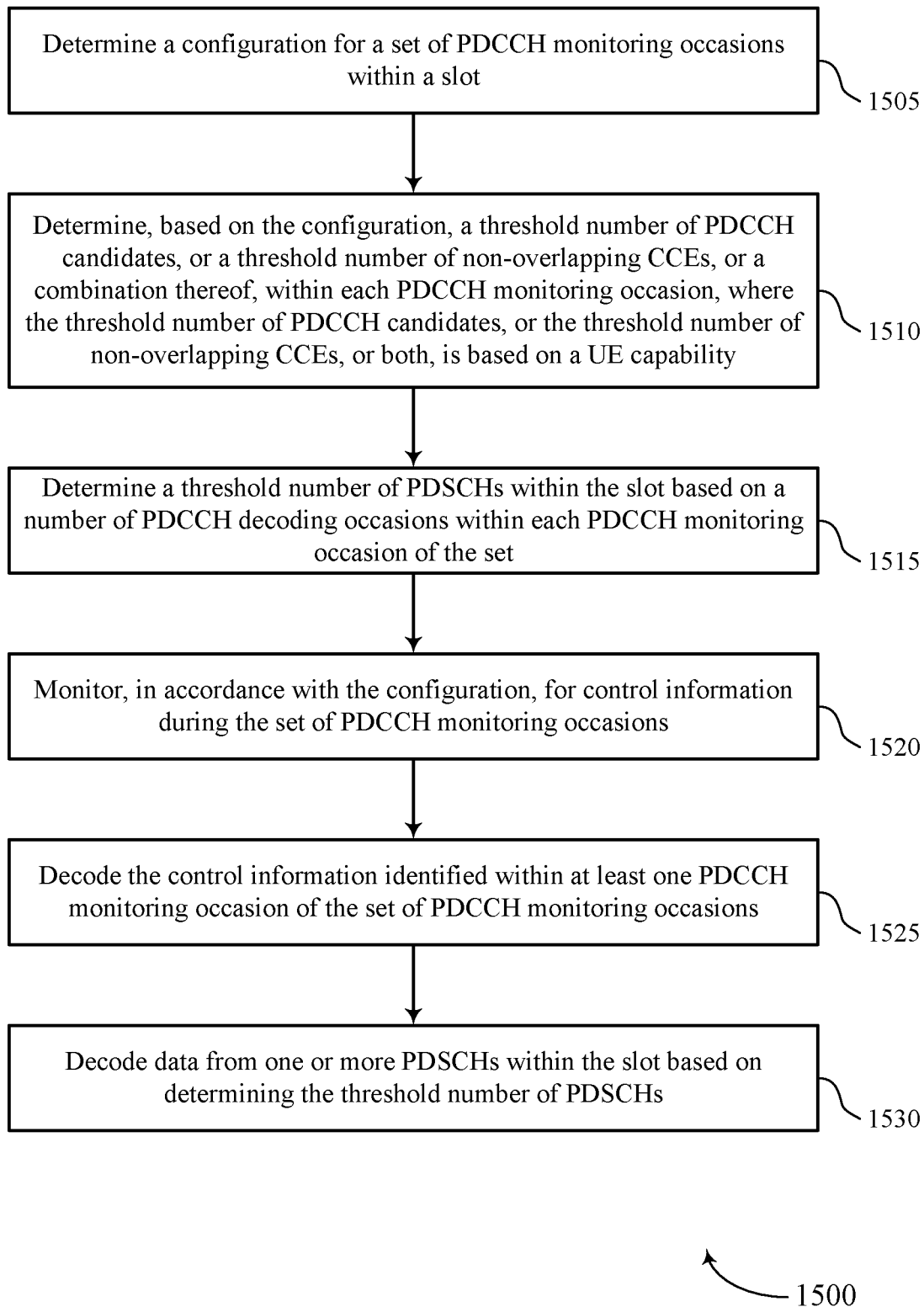

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may determine a configuration for a set of PDCCH monitoring occasions within a slot. The operations of 1505 may be performed according to the methods described herein. In some examples, aspects of the operations of 1505 may be performed by a monitoring occasion manager as described with reference to FIGS. 6 through 9.

At 1510, the UE may determine, based on the configuration, a threshold number of PDCCH candidates, or a threshold number of non-overlapping CCEs, or a combination thereof, within each PDCCH monitoring occasion, where the threshold number of PDCCH candidates, or the threshold number of non-overlapping CCEs, or both, is based on a UE capability. The operations of 1510 may be performed according to the methods described herein. In some examples, aspects of the operations of 1510 may be performed by a PDCCH candidate and CCE manager as described with reference to FIGS. 6 through 9.

At 1515, the UE may determine a threshold number of PDSCH within the slot based on a number of PDCCH decoding occasions within each PDCCH monitoring occasion of the set. The operations of 1515 may be performed according to the methods described herein. In some examples, aspects of the operations of 1515 may be performed by a PDSCH manager as described with reference to FIGS. 6 through 9.

At 1520, the UE may monitor, in accordance with the configuration, for control information during the set of PDCCH monitoring occasions. The operations of 1520 may be performed according to the methods described herein. In some examples, aspects of the operations of 1520 may be performed by a control information monitor as described with reference to FIGS. 6 through 9.

At 1525, the UE may decode the control information identified within at least one PDCCH monitoring occasion of the set of PDCCH monitoring occasions. The operations of 1525 may be performed according to the methods described herein. In some examples, aspects of the operations of 1525 may be performed by a control information decoder as described with reference to FIGS. 6 through 9.

At 1530, the UE may decode data from one or more PDSCHs within the slot based on determining the threshold number of PDSCHs. The operations of 1530 may be performed according to the methods described herein. In some examples, aspects of the operations of 1530 may be performed by a PDSCH manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining a first configuration for a set of physical downlink control channel (PDCCH) monitoring occasions during a slot, the first configuration comprising a threshold number of PDCCH candidates, or a threshold number of non-overlapping control channel elements (CCEs), or a combination thereof, within each PDCCH monitoring occasion of the set of PDCCH monitoring occasions;

determining a second configuration for monitoring the set of PDCCH monitoring occasions, the second configuration comprising a threshold number of PDCCH candidates, or a threshold number of non-overlapping CCEs, or a combination thereof, within the slot;

monitoring, in accordance with the first configuration and the second configuration, for control information during the set of PDCCH monitoring occasions; and decoding the control information identified within at least one PDCCH monitoring occasion of the set of PDCCH monitoring occasions.

2. The method of claim 1, wherein the threshold number of PDCCH candidates, or the threshold number of non-overlapping CCEs, or both, within each PDCCH monitoring occasion is fixed.

3. The method of claim 1, further comprising:

determining a threshold number of physical downlink shared channels (PDSCHs) within the slot based at least in part on a number of PDCCH decoding occasions within each PDCCH monitoring occasion of the set; and decoding data from one or more PDSCHs within the slot based at least in part on determining the threshold number of PDSCHs.

4. The method of claim 3, wherein the threshold number of PDCCH candidates, or the threshold number of non-overlapping CCEs, or a combination thereof, is based at least in part on the threshold number of PDSCHs.

5. The method of claim 1, further comprising:

decoding a physical downlink shared channel (PDSCH) within the slot based at least in part on a threshold associated with a transport block size (TBS) for the PDSCH, a rank for the PDSCH, a modulation and coding scheme (MCS) for the PDSCH, or a number of component carriers (CCs) for the PDSCH, or a combination thereof.

6. A method for wireless communication, comprising:

determining a configuration for a set of physical downlink control channel (PDCCH) monitoring occasions within a slot;

determining, based at least in part on the configuration, a threshold number of PDCCH candidates, or a threshold number of non-overlapping control channel elements (CCEs), or a combination thereof, within each PDCCH monitoring occasion, wherein the threshold number of PDCCH candidates, or the threshold number of non-overlapping CCEs, or both, is based at least in part on a number of PDCCH monitoring occasions in the set of PDCCH monitoring occasions;

monitoring, in accordance with the configuration, for control information during the set of PDCCH monitoring occasions; and decoding the control information identified within at least one PDCCH monitoring occasion of the set of PDCCH monitoring occasions.

7. The method of claim 6, wherein the threshold number of PDCCH candidates, or the threshold number of non-overlapping CCEs, or both, within each PDCCH monitoring occasion is inversely proportional to the number of PDCCH monitoring occasions.

8. The method of claim 6, further comprising:

decoding a physical downlink shared channel (PDSCH) within the slot based at least in part on a threshold associated with a transport block size (TBS) for the PDSCH, a rank for the PDSCH, a modulation and coding scheme (MCS) for the PDSCH, or a number of component carriers (CCs) for the PDSCH, or a combination thereof.

9. The method of claim 6, further comprising:

determining a threshold number of physical downlink shared channels (PDSCHs) within the slot based at least in part on a number of PDCCH decoding occasions within each PDCCH monitoring occasion of the set; and decoding data from one or more PDSCHs within the slot based at least in part on determining the threshold number of PDSCHs.

10. The method of claim 9, wherein the threshold number of PDCCH candidates, or the threshold number of non-overlapping CCEs, or a combination thereof, is based at least in part on the threshold number of PDSCHs.

11. A method for wireless communication, comprising:

determining a configuration for a set of physical downlink control channel (PDCCH) monitoring occasions within a slot;

determining, based at least in part on the configuration, a threshold number of PDCCH candidates, or a threshold number of non-overlapping control channel elements (CCEs), or a combination thereof, within each PDCCH monitoring occasion, wherein the threshold number of PDCCH candidates, or the threshold number of non-overlapping CCEs, or both, is based at least in part on a user equipment (UE) capability;

monitoring, in accordance with the configuration, for control information during the set of PDCCH monitoring occasions; and decoding the control information identified within at least one PDCCH monitoring occasion of the set of PDCCH monitoring occasions.

12. The method of claim 11, wherein the threshold number of PDCCH candidates, or the threshold number of non-overlapping CCEs, or both, within each PDCCH monitoring occasion is proportional to a number of PDCCH monitoring occasions within the slot.

13. The method of claim 11, further comprising:

transmitting, to a base station, an indication of the UE capability; and identifying, based at least in part on the UE capability, a set of parameters corresponding to the threshold number of PDCCH candidates, or the threshold number of non-overlapping CCEs, or both.

14. The method of claim 13, wherein the UE capability comprises a maximum number of PDCCH monitoring occasions supported by a UE.

15. The method of claim 11, further comprising:

determining a threshold number of physical downlink shared channels (PDSCHs) within the slot based at least in part on a number of PDCCH decoding occasions within each PDCCH monitoring occasion of the set; and decoding data from one or more PDSCHs within the slot based at least in part on determining the threshold number of PDSCHs.

16. The method of claim 15, wherein the threshold number of PDCCH candidates, or the threshold number of non-overlapping CCEs, or a combination thereof, is based at least in part on the threshold number of PDSCHs.

17. The method of claim 11, further comprising:

decoding a physical downlink shared channel (PDSCH) within the slot based at least in part on a threshold associated with a transport block size (TBS) for the PDSCH, a rank for the PDSCH, a modulation and coding scheme (MCS) for the PDSCH, or a number of component carriers (CCs) for the PDSCH, or a combination thereof.

18. An apparatus for wireless communication, comprising:
a processor,
memory in electronic communication with the processor; and
instructions stored in the memory and executable by the processor to cause the apparatus to:
determine a first configuration for a set of physical downlink control channel (PDCCH) monitoring occasions during a slot, the first configuration comprising a threshold number of PDCCH candidates, or a threshold number of non-overlapping control channel elements (CCEs), or a combination thereof, within each PDCCH monitoring occasion of the set of PDCCH monitoring occasions;
determine a second configuration for monitoring the set of PDCCH monitoring occasions, the second configuration comprising a threshold number of PDCCH candidates, or a threshold number of non-overlapping CCEs, or a combination thereof, within the slot;
monitor, in accordance with the first configuration and the second configuration, for control information during the set of PDCCH monitoring occasions; and
decode the control information identified within at least one PDCCH monitoring occasion of the set of PDCCH monitoring occasions.

19. The apparatus of claim 18, wherein the threshold number of PDCCH candidates, or the threshold number of non-overlapping control channel elements (CCEs), or both, within each PDCCH monitoring occasion is fixed.

20. The apparatus of claim 18, wherein the instructions are further executable by the processor to cause the apparatus to:
determine a threshold number of physical downlink shared channels (PDSCHs) within the slot based at least in part on a number of PDCCH decoding occasions within each PDCCH monitoring occasion of the set; and
decode data from one or more PDSCHs within the slot based at least in part on determining the threshold number of PDSCHs.

21. The apparatus of claim 20, wherein the threshold number of PDCCH candidates, or the threshold number of non-overlapping CCEs, or a combination thereof, is based at least in part on the threshold number of PDSCHs.

22. The apparatus of claim 18, wherein the instructions are further executable by the processor to cause the apparatus to:
decode a physical downlink shared channel (PDSCH) within the slot based at least in part on a threshold associated with a transport block size (TBS) for the PDSCH, a rank for the PDSCH, a modulation and coding scheme (MCS) for the PDSCH, or a number of component carriers (CCs) for the PDSCH, or a combination thereof.

23. An apparatus for wireless communication, comprising:
a processor,
memory in electronic communication with the processor; and
instructions stored in the memory and executable by the processor to cause the apparatus to:
determine a configuration for a set of physical downlink control channel (PDCCH) monitoring occasions within a slot;
determine, based at least in part on the configuration, a threshold number of PDCCH candidates, or a threshold number of non-overlapping control channel elements (CCEs), or a combination thereof, within each PDCCH monitoring occasion, wherein the threshold number of PDCCH candidates, or the threshold number of non-overlapping CCEs, or both, is based at least in part on a number of PDCCH monitoring occasions in the set of PDCCH monitoring occasions;
monitor, in accordance with the configuration, for control information during the set of PDCCH monitoring occasions; and
decode the control information identified within at least one PDCCH monitoring occasion of the set of PDCCH monitoring occasions.

24. The apparatus of claim 23, wherein the threshold number of PDCCH candidates, or the threshold number of non-overlapping CCEs, or both, within each PDCCH monitoring occasion is inversely proportional to the number of PDCCH monitoring occasions.

25. The apparatus of claim 23, further comprising:
a transceiver configured to receive a set of signals including one or more physical downlink shared channels (PDSCHs), wherein the instructions are further executable by the processor to cause the apparatus to:
decode a PDSCH within the slot based at least in part on a threshold associated with a transport block size (TBS) for the PDSCH, a rank for the PDSCH, a modulation and coding scheme (MCS) for the PDSCH, or a number of component carriers (CCs) for the PDSCH, or a combination thereof.

26. The apparatus of claim 23, wherein the instructions are further executable by the processor to cause the apparatus to:
determine a threshold number of physical downlink shared channels (PDSCHs) within the slot based at least in part on a number of PDCCH decoding occasions within each PDCCH monitoring occasion of the set; and
decode data from one or more PDSCHs within the slot based at least in part on determining the threshold number of PDSCHs.

27. The apparatus of claim 26, wherein the threshold number of PDCCH candidates, or the threshold number of non-overlapping CCEs, or a combination thereof, is based at least in part on the threshold number of PDSCHs.

28. An apparatus for wireless communication, comprising:
a processor,
memory in electronic communication with the processor; and
instructions stored in the memory and executable by the processor to cause the apparatus to:
determine a configuration for a set of physical downlink control channel (PDCCH) monitoring occasions within a slot;
determine, based at least in part on the configuration, a threshold number of PDCCH candidates, or a threshold number of non-overlapping control channel elements (CCEs), or a combination thereof, within each PDCCH monitoring occasion, wherein the threshold number of PDCCH candidates, or the threshold number of non-overlapping CCEs, or both, is based at least in part on a user equipment (UE) capability;
monitor, in accordance with the configuration, for control information during the set of PDCCH monitoring occasions; and
decode the control information identified within at least one PDCCH monitoring occasion of the set of PDCCH monitoring occasions.

29. The apparatus of claim 28, wherein the threshold number of PDCCH candidates, or the threshold number of non-overlapping CCEs, or both, within each PDCCH monitoring occasion is proportional to a number of PDCCH monitoring occasions within the slot.

30. The apparatus of claim 28, wherein the instructions are further executable by the processor to cause the apparatus to:
transmit, to a base station, an indication of the UE capability; and
identify, based at least in part on the UE capability, a set of parameters corresponding to the threshold number of PDCCH candidates, or the threshold number of non-overlapping CCEs, or both.

31. The apparatus of claim 30, wherein the UE capability comprises a maximum number of PDCCH monitoring occasions supported by a UE.

32. The apparatus of claim 28, wherein the instructions are further executable by the processor to cause the apparatus to:
determine a threshold number of physical downlink shared channels (PDSCHs) within the slot based at least in part on a number of PDCCH decoding occasions within each PDCCH monitoring occasion of the set; and
decode data from one or more PDSCHs within the slot based at least in part on determining the threshold number of PDSCHs.

33. The apparatus of claim 32, wherein the threshold number of PDCCH candidates, or the threshold number of non-overlapping CCEs, or a combination thereof, is based at least in part on the threshold number of PDSCHs.

34. The apparatus of claim 28, wherein the instructions are further executable by the processor to cause the apparatus to:
decode a physical downlink shared channel (PDSCH) within the slot based at least in part on a threshold associated with a transport block size (TBS) for the PDSCH, a rank for the PDSCH, a modulation and coding scheme (MCS) for the PDSCH, or a number of component carriers (CCs) for the PDSCH, or a combination thereof.

35. An apparatus for wireless communication, comprising:
means for determining a first configuration for a set of physical downlink control channel (PDCCH) monitoring occasions during a slot, the first configuration comprising a threshold number of PDCCH candidates, or a threshold number of non-overlapping control channel elements (CCEs), or a combination thereof, within each PDCCH monitoring occasion of the set of PDCCH monitoring occasions;
means for determining a second configuration for monitoring the set of PDCCH monitoring occasions, the second configuration comprising a threshold number of PDCCH candidates, or a threshold number of non-overlapping CCEs, or a combination thereof, within the slot;
means for monitoring, in accordance with the first configuration and the second configuration, for control information during the set of PDCCH monitoring occasions; and
means for decoding the control information identified within at least one PDCCH monitoring occasion of the set of PDCCH monitoring occasions.

36. An apparatus for wireless communication, comprising:
means for determining a configuration for a set of physical downlink control channel (PDCCH) monitoring occasions within a slot;
means for determining, based at least in part on the configuration, a threshold number of PDCCH candidates, or a threshold number of non-overlapping control channel elements (CCEs), or a combination thereof, within each PDCCH monitoring occasion, wherein the threshold number of PDCCH candidates, or the threshold number of non-overlapping CCEs, or both, is based at least in part on a number of PDCCH monitoring occasions in the set of PDCCH monitoring occasions;
means for monitoring, in accordance with the configuration, for control information during the set of PDCCH monitoring occasions; and
means for decoding the control information identified within at least one PDCCH monitoring occasion of the set of PDCCH monitoring occasions.

37. An apparatus for wireless communication, comprising:
means for determining a configuration for a set of physical downlink control channel (PDCCH) monitoring occasions within a slot;
means for determining, based at least in part on the configuration, a threshold number of PDCCH candidates, or a threshold number of non-overlapping control channel elements (CCEs), or a combination thereof, within each PDCCH monitoring occasion, wherein the threshold number of PDCCH candidates, or the threshold number of non-overlapping CCEs, or both, is based at least in part on a user equipment (UE) capability;
means for monitoring, in accordance with the configuration, for control information during the set of PDCCH monitoring occasions; and
means for decoding the control information identified within at least one PDCCH monitoring occasion of the set of PDCCH monitoring occasions.

38. A non-transitory computer-readable medium storing code for wireless communication, the code comprising instructions executable by a processor to:
determine a first configuration for a set of physical downlink control channel (PDCCH) monitoring occasions during a slot, the first configuration comprising a threshold number of PDCCH candidates, or a threshold number of non-overlapping control channel elements (CCEs), or a combination thereof, within each PDCCH monitoring occasion of the set of PDCCH monitoring occasions;
determine a second configuration for monitoring the set of PDCCH monitoring occasions, the second configuration comprising a threshold number of PDCCH candidates, or a threshold number of non-overlapping CCEs, or a combination thereof, within the slot;
monitor, in accordance with the first configuration and the second configuration, for control information during the set of PDCCH monitoring occasions; and decode the control information identified within at least one PDCCH monitoring occasion of the set of PDCCH monitoring occasions.

39. A non-transitory computer-readable medium storing code for wireless communication, the code comprising instructions executable by a processor to:

determine a configuration for a set of physical downlink control channel (PDCCH) monitoring occasions within a slot;

determine, based at least in part on the configuration, a threshold number of PDCCH candidates, or a threshold number of non-overlapping control channel elements (CCEs), or a combination thereof, within each PDCCH monitoring occasion, wherein the threshold number of PDCCH candidates, or the threshold number of non-overlapping CCEs, or both, is based at least in part on a number of PDCCH monitoring occasions in the set of PDCCH monitoring occasions;

monitor, in accordance with the configuration, for control information during the set of PDCCH monitoring occasions; and decode the control information identified within at least one PDCCH monitoring occasion of the set of PDCCH monitoring occasions.

40. A non-transitory computer-readable medium storing code for wireless communication, the code comprising instructions executable by a processor to:

determine a configuration for a set of physical downlink control channel (PDCCH) monitoring occasions within a slot;

determine, based at least in part on the configuration, a threshold number of PDCCH candidates, or a threshold number of non-overlapping control channel elements (CCEs), or a combination thereof, within each PDCCH monitoring occasion, wherein the threshold number of PDCCH candidates, or the threshold number of non-overlapping CCEs, or both, is based at least in part on a user equipment (UE) capability;

monitor, in accordance with the configuration, for control information during the set of PDCCH monitoring occasions; and decode the control information identified within at least one PDCCH monitoring occasion of the set of PDCCH monitoring occasions.

* * * * *